United States Patent
Gao et al.

(10) Patent No.: US 12,034,584 B2
(45) Date of Patent: Jul. 9, 2024

(54) SIGNAL SENDING METHOD, SIGNAL RECEIVING METHOD, AND RELATED APPARATUS

(71) Applicant: HUAWEI TECHNOLOGIES CO., LTD., GuangDong (CN)

(72) Inventors: Xiang Gao, Beijing (CN); Xinqian Xie, Beijing (CN); Zhiheng Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

(21) Appl. No.: 18/071,200

(22) Filed: Nov. 29, 2022

(65) Prior Publication Data

US 2023/0103770 A1    Apr. 6, 2023

Related U.S. Application Data

(63) Continuation of application No. PCT/CN2021/096535, filed on May 27, 2021.

(30) Foreign Application Priority Data

May 30, 2020 (CN) .......................... 202010480842.7

(51) Int. Cl.
H04L 27/34 (2006.01)

(52) U.S. Cl.
CPC ...... *H04L 27/3483* (2013.01); *H04L 27/3405* (2013.01)

(58) Field of Classification Search
CPC .......................... H04L 27/3483; H04L 27/3405
See application file for complete search history.

(56) References Cited

U.S. PATENT DOCUMENTS

| | | | |
|---|---|---|---|
| 9,014,306 B2 * | 4/2015 | Etemadi | H03G 3/20 375/346 |
| 10,547,487 B1 | 1/2020 | Zhang et al. | |

(Continued)

FOREIGN PATENT DOCUMENTS

| | | |
|---|---|---|
| CN | 102820934 A | 12/2012 |
| CN | 105515713 A | 4/2016 |

(Continued)

OTHER PUBLICATIONS

Nokia, Nokia Shanghai Bell, Design details of 1024QAM. 3GPP TSG-RAN WG1 Meeting #90bis, Prague, Czech Republic, Oct. 9-13, 2017, R1-1718016; 4 pages.

(Continued)

*Primary Examiner* — Freshteh N Aghdam
(74) *Attorney, Agent, or Firm* — Rimon PC

(57) ABSTRACT

This application provides a signal sending method, a signal receiving method, and a related apparatus. The method includes: modulating a bit stream to generate a modulated symbol. The modulation order of the bit stream is n, a value of the modulated symbol is one of a plurality of complex number sets, and the complex number set includes $Y=2^n$ complex numbers. The complex number set meets the following requirements: a ratio of a real part of a first complex number with a largest absolute value of the real part to a real part of a second complex number with a smallest absolute value of the real part is equal to M:N, where M and N are positive integers, and a greatest common divisor of M and N is 1.

20 Claims, 6 Drawing Sheets

(56) References Cited

U.S. PATENT DOCUMENTS

| | | | | |
|---|---|---|---|---|
| 2004/0247039 A1* | 12/2004 | Dimsdle | ............ | H04L 27/3845 |
| | | | | 375/326 |
| 2007/0183541 A1* | 8/2007 | Moorti | ................. | H04L 25/067 |
| | | | | 375/262 |
| 2015/0003262 A1* | 1/2015 | Eder | ................... | H04B 7/0413 |
| | | | | 370/252 |

FOREIGN PATENT DOCUMENTS

| | | | | |
|---|---|---|---|---|
| CN | 107493154 A | | 12/2017 | |
| CN | 109391292 A | | 2/2019 | |
| EP | 2985966 A1 | * | 2/2016 | ......... H04L 27/0008 |
| EP | 3481140 A1 | | 5/2019 | |
| WO | 2015107088 A1 | | 7/2015 | |
| WO | 2016096039 A1 | | 6/2016 | |
| WO | 2016154911 A1 | | 10/2016 | |
| WO | 2018203727 A1 | | 11/2018 | |
| WO | 2018228579 A1 | | 12/2018 | |

OTHER PUBLICATIONS

Hu Shengquan et al, "On 1024QAM Modulation", IEEE 802.11-16/0656r1, May 11, 2016; 23 total pages.
3GPP TS 38.214 V16.1.0 (Mar. 2020), 3rd Generation Partnership Project; Technical Specification Group Radio Access Network; NR; Physical layer procedures for data (Release 16); 151 pages.
Liu et al., "OFDM Signal Subcarrier Recognition in OFDM Multi-Carrier System," Computer Systems & Applications, vol. 27, No. 11, Nov. 5, 2018; pp. 120-127 (8 total pages).

\* cited by examiner

SIGNAL SENDING METHOD, SIGNAL RECEIVING METHOD, AND RELATED APPARATUS

CROSS-REFERENCE TO RELATED APPLICATIONS

This application is a continuation of International Application No. PCT/CN2021/096535, filed on May 27, 2021, which claims priority to Chinese Patent Application No. 202010480842.7, filed on May 30, 2020. The disclosures of the aforementioned applications are hereby incorporated by reference in their entireties.

TECHNICAL FIELD

This application relates to the field of communication technologies, and in particular, to a signal sending method, a signal receiving method, and a related apparatus.

BACKGROUND

Constellation mapping is a common digital modulation technology. Through constellation mapping, a bit sequence (or bit stream) carrying information is mapped to a symbol sequence suitable for actual channel transmission. Constellation mapping specifically means to map bit streams to points on a complex plane. The complex plane, namely, a constellation diagram, represents a complex number set including all values of output symbols of constellation mapping. Each constellation point in the constellation diagram corresponds to a value of an output symbol.

Design of the constellation diagram affects signal transmission performance, such as bit error rate and throughput. Therefore, how to obtain a constellation diagram with better transmission performance is a problem that needs to be considered.

SUMMARY

This application provides a signal sending method, a signal receiving method, and a related apparatus, to improve signal transmission performance.

According to a first aspect, this application provides a signal sending method, applied to a sending device. The method includes: modulating a bit stream to generate a modulated symbol, where a modulation order of the bit stream is n, a value of the modulated symbol is one of a plurality of complex number sets, each of the plurality of complex number sets includes $Y=2^n$ complex numbers, and a ratio of a real part of a first complex number with a largest absolute value of the real part in the complex number set to a real part of a second complex number with a smallest absolute value of the real part in the complex number set is equal to M:N, where M and N are positive integers, a greatest common divisor of M and N is 1, and M further meets at least one of the following:

- when n is equal to 4, M is greater than 3 and less than 16;
- when n is equal to 6, M is greater than 7 and less than 32;
- when n is equal to 8, M is greater than 15 and less than 64; or
- when n is equal to 10, M is greater than 31 and less than 128; and sending the modulated symbol to a receiving device.

In some embodiments of this application, the complex number set corresponding to the modulation symbol obtained by modulating the bit stream meets the foregoing condition, and the complex number set, namely, a constellation diagram, can implement better transmission performance. For example, comparison is made between using QAM and using a complex number set in this application. (1) When a condition 1 that each modulated symbol carries a same quantity of bits is met, using the complex number set in this application may reduce a demodulation threshold of the receiving device compared with using QAM. (2) When the condition 1 that each modulated symbol carries a same quantity of bits and a condition 2 that a same demodulation threshold is used are met, using the complex number set in this application can obtain a higher throughput and a lower block error rate compared with using QAM. The foregoing comparison results may be obtained in a simulation manner, and details are not described in this application.

In a possible design, the complex number set further meets: a ratio of an imaginary part of a third complex number whose absolute value of the imaginary part is largest in the complex number set to an imaginary part of a fourth complex number whose absolute value of the imaginary part is smallest in the complex number set is equal to M:N.

In some embodiments of this application, the complex number set meets: a ratio of a real part of a first complex number with a largest absolute value of the real part to a real part of a second complex number with a smallest absolute value of the real part in the complex number set is equal to M:N, and a ratio of an imaginary part of a third complex number whose absolute value of the imaginary part is largest to an imaginary part of a fourth complex number whose absolute value of the imaginary part is smallest in the complex number set is equal to M:N. In this way, the constraints of the real part and the imaginary part in the complex number set, namely, the constellation diagram are the same, and a contour formed by a point with a maximum absolute value of the real part and a point with a maximum absolute value of the imaginary part in the constellation diagram is a regular contour, for example, a circle.

In a possible design, the method further includes: determining the complex number set based on a modulation and coding scheme. The complex number set is a first complex number set when the modulation and coding scheme is a first modulation and coding scheme; or the complex number set is a second complex number set when the modulation and coding scheme is a second modulation and coding scheme.

When a modulation order corresponding to the first modulation and coding scheme is equal to a modulation order corresponding to the second modulation and coding scheme, values obtained by multiplying K complex numbers in the first complex number set by a real number A are respectively equal to values obtained by multiplying K complex numbers in the second complex number set by a real number B. Y-K complex numbers in the first complex number set other than the K complex numbers are not equal to values obtained by multiplying Y-K complex numbers in the second complex number set other than the K complex numbers by any non-zero real number. The real number A and the real number B are normalization coefficients.

In some embodiments of this application, a same modulation order n corresponds to a plurality of complex number sets. For example, a modulation order n=6 corresponds to a plurality of complex number sets, and the plurality of complex number sets correspond to different MCSs. In a case of a same modulation order n, QAM corresponds to one complex number set. For example, a modulation order n=6 corresponds to one QAM. Therefore, the complex number set in this application is designed more flexible. In addition, in one embodiment of this application, there is a nesting relationship in the plurality of complex number sets corresponding to the same modulation order n (to be specific, values obtained by multiplying K complex numbers in the first complex number set by a real number A are respectively equal to values obtained by multiplying K complex numbers in the second complex number set by a real number B). Each complex number set may be stored in two parts: the values obtained by multiplying the K complex numbers in the complex number set by the real number A are stored in a first part, and the real number A, namely, a normalization coefficient is stored in a second part. Therefore, first parts of the plurality of complex number sets have a same value. Therefore, only one of the first parts needs to be stored as a common part, lowering overall storage overheads.

In a possible design, a modulus value of any complex number in the K complex numbers in the first complex number set is greater than a modulus value of any complex number in the Y-K complex numbers in the first complex number set; and/or a modulus value of any complex number in the K complex numbers in the second complex number set is greater than a modulus value of any complex number in the Y-K complex numbers in the second complex number set.

In other words, in some embodiments of this application, there is a nesting relationship in the plurality of complex number sets corresponding to the same modulation order n (to be specific, values obtained by multiplying K complex numbers in the first complex number set by a real number A are respectively equal to values obtained by multiplying K complex numbers in the second complex number set by a real number B), and the K complex numbers having the nesting relationship are complex numbers with large modulus values in the complex number set.

In an example, when n is equal to 6, K is equal to 32. When n=6, each complex number set has 64 complex numbers in total, and there is a nesting relationship between 32 complex numbers. This greatly reduces storage overheads.

In a possible design, a ratio of a modulus value of a complex number in first P complex numbers to a modulus value of a complex number in K-P complex numbers in the first complex number set other than the P complex numbers is equal to Q, where the first P complex numbers are numbers, in the K complex numbers, obtained by arranging modulus values of the K complex numbers in the first complex number set in descending order, Q is a positive number greater than 1, and Q further meets the following condition: when n is equal to 6, Q is greater than 1.34 and less than 1.42; and a ratio of a modulus value of a complex number in first P complex numbers to a modulus value of a complex number in K-P complex numbers in the second complex number set other than the P complex numbers is equal to Q, where the first P complex numbers are numbers, in the K complex numbers, obtained by arranging modulus values of the K complex numbers in the second complex number set in descending order, Q is a positive number greater than 1, and Q further meets the following condition: when n is equal to 6, Q is greater than 1.34 and less than 1.42.

In some embodiments of this application, a ratio of modulus values of the P complex numbers in the K complex numbers in the complex number set to modulus values of the K-P complex numbers other than the P complex numbers meets a condition that the ratio is greater than 1.34 and less than 1.42. In this way, distances between the P complex numbers and the K-P complex numbers in the K complex numbers are extended as much as possible, and a long distance between two complex numbers can help a receive end accurately determine a complex number that is closest to a value of a received modulated symbol, to improve demodulation accuracy.

In some embodiments of this application, the same modulation order n corresponds to the plurality of complex number sets, and the modulated symbol obtained by mapping and modulating the bit stream by the sending device is one of the plurality of complex number sets. The sending device may indicate the specific complex number set to the receiving device, so that the receiving device demodulates the modulated symbol based on the complex number set.

In a possible manner, the sending device sends indication information to the receiving device, where the indication information indicates the complex number set corresponding to the modulated symbol. For example, the indication information may be control information DCI.

In another possible manner, the sending device sends control information DCI to the receiving device, where the DCI is scrambled by using first information, and the first information indicates the complex number set corresponding to the modulated symbol. In other words, the sending device implicitly indicates the complex number set corresponding to the modulated symbol to the receiving device.

According to a second aspect, this application further provides a signal receiving method, applied to a receiving device. The method includes: receiving a modulated symbol from a sending device; and demodulating the modulated symbol based on a complex number set corresponding to the modulated symbol, to obtain a bit stream.

A value of the modulated symbol is one of a plurality of complex number sets, each of the plurality of complex number sets includes $Y=2^n$ complex numbers, n is a modulation order of the bit stream. A ratio of a real part of a first complex number with a largest absolute value of the real part in the complex number set to a real part of a second complex number with a smallest absolute value of the real part in the complex number set is equal to M:N. M and N are positive integers, a greatest common divisor of M and N is 1, and M further meets at least one of the following:

when n is equal to 4, M is greater than 3 and less than 16;
when n is equal to 6, M is greater than 7 and less than 32;
when n is equal to 8, M is greater than 15 and less than 64; or
when n is equal to 10, M is greater than 31 and less than 128.

In some embodiments of this application, the value of the modulated symbol detected by the receiving device is one of the plurality of complex number sets. The complex number set meets the foregoing condition, and the complex number set, namely, a constellation diagram, can implement better transmission performance. For example, comparison between QAM and a complex number set in this application is used as an example. (1) When a condition 1 that each modulated symbol carries a same quantity of bits is met, using the complex number set in this application may reduce a demodulation threshold of the receiving device compared with using QAM. (2) When the condition 1 that each modulated symbol carries a same quantity of bits and a condition 2 that a same demodulation threshold is used are met, using the complex number set in this application can obtain a higher throughput and a lower block error rate compared with using QAM. The foregoing comparison results may be obtained in a simulation manner, and details are not described in an embodiment of this application.

In a possible design, the complex number set further meets: a ratio of an imaginary part of a third complex number whose absolute value of the imaginary part is largest in the complex number set to an imaginary part of a fourth complex number whose absolute value of the imaginary part is smallest in the complex number set is equal to M:N.

In a possible design, the plurality of complex number sets include a first complex number set and a second complex number set, the first complex number set is determined based on a first modulation and coding scheme, and the second complex number set is determined based on a second modulation and coding scheme. When a modulation order corresponding to the first modulation and coding scheme is equal to a modulation order corresponding to the second modulation and coding scheme, values obtained by multiplying K complex numbers in the first complex number set by a real number A are respectively equal to values obtained by multiplying K complex numbers in the second complex number set by a real number B. Y-K complex numbers in the first complex number set other than the K complex numbers are not equal to values obtained by multiplying Y-K complex numbers in the second complex number set other than the K complex numbers by any non-zero real number. The real number A and the real number B are normalization coefficients.

In a possible design, a modulus value of any complex number in the K complex numbers in the first complex number set is greater than a modulus value of any complex number in the Y-K complex numbers in the first complex number set; and/or a modulus value of any complex number in the K complex numbers in the second complex number set is greater than a modulus value of any complex number in the Y-K complex numbers in the second complex number set.

In a possible design, when n is equal to 6, K is equal to 32.

In a possible design, a ratio of a modulus value of a complex number in first P complex numbers to a modulus value of a complex number in K-P complex numbers in the first complex number set other than the P complex numbers is equal to Q, where the first P complex numbers are numbers, in the K complex numbers, obtained by arranging modulus values of the K complex numbers in the first complex number set in descending order, Q is a positive number greater than 1, and Q further meets the following condition: when n is equal to 6, Q is greater than 1.34 and less than 1.42; and
  a ratio of a modulus value of a complex number in first P complex numbers to a modulus value of a complex number in K-P complex numbers in the second complex number set other than the P complex numbers is equal to Q, where the first P complex numbers are numbers, in the K complex numbers, obtained by arranging modulus values of the K complex numbers in the second complex number set in descending order, Q is a positive number greater than 1, and Q further meets the following condition: when n is equal to 6, Q is greater than 1.34 and less than 1.42.

In a possible design, before demodulating the modulated symbol based on a complex number set corresponding to the modulated symbol, the method further includes: receiving indication information from the sending device, where the indication information indicates the complex number set corresponding to the modulated symbol.

In a possible design, before demodulating the modulated symbol based on a complex number set corresponding to the modulated symbol, the method further includes: receiving control information DCI sent by the sending device, where the DCI is scrambled by using first information, and the first information indicates the complex number set corresponding to the modulated symbol.

According to a third aspect, this application further provides a sending device, including:
  a processing unit, configured to modulate a bit stream to generate a modulated symbol, where a modulation order of the bit stream is n, a value of the modulated symbol is one of a plurality of complex number sets, each of the plurality of complex number sets includes $Y=2^n$ complex numbers, and a ratio of a real part of a first complex number with a largest absolute value of the real part in the complex number set to a real part of a second complex number with a smallest absolute value of the real part in the complex number set is equal to M:N, where M and N are positive integers, a greatest common divisor of M and N is 1, and M further meets at least one of the following:
    when n is equal to 4, M is greater than 3 and less than 16;
    when n is equal to 6, M is greater than 7 and less than 32;
    when n is equal to 8, M is greater than 15 and less than 64; or
    when n is equal to 10, M is greater than 31 and less than 128; and
  a transceiver unit, configured to send the modulated symbol to a receiving device.

According to a fourth aspect, this application further provides a receiving device, including:
  a transceiver unit, configured to receive a modulated symbol from a sending device; and
  a processor unit, configured to demodulate the modulated symbol based on a complex number set corresponding to the modulated symbol, to obtain a bit stream.

A value of the modulated symbol is one of a plurality of complex number sets, each of the plurality of complex number sets includes $Y=2^n$ complex numbers, n is a modulation order of the bit stream, and a ratio of a real part of a first complex number with a largest absolute value of the real part in the complex number set to a real part of a second complex number with a smallest absolute value of the real part in the complex number set is equal to M:N, where M and N are positive integers, a greatest common divisor of M and N is 1, and M further meets at least one of the following:
  when n is equal to 4, M is greater than 3 and less than 16;
  when n is equal to 6, M is greater than 7 and less than 32;
  when n is equal to 8, M is greater than 15 and less than 64; or
  when n is equal to 10, M is greater than 31 and less than 128.

According to a fifth aspect, this application further provides a sending device, including at least one processor. The at least one processor is coupled to at least one memory, and the at least one processor is configured to execute a computer program or instructions stored in the at least one memory, to enable the apparatus to perform the method provided in the first aspect.

According to a sixth aspect, this application further provides a receiving device, including at least one processor. The at least one processor is coupled to at least one memory, and the at least one processor is configured to execute a computer program or instructions stored in the at least one memory, to enable the apparatus to perform the method provided in the second aspect.

According to a seventh aspect, this application further provides a chip. The chip is coupled to a memory in a communication apparatus, so that the chip invokes, when running, program instructions stored in the memory, to enable the apparatus to perform the method provided in the first aspect.

According to an eighth aspect, this application further provides a chip. The chip is coupled to a memory in a communication apparatus, so that the chip invokes, when running, program instructions stored in the memory, to enable the apparatus to perform the method provided in the second aspect.

According to a ninth aspect, this application further provides a communication system, including:
 a sending device, configured to implement the method provided in the first aspect; and
 a receiving device, configured to implement the method provided in the second aspect.

According to a tenth aspect, this application further provides a computer-readable storage medium. The computer-readable storage medium stores a computer program or instructions. When a computer reads and executes the computer program or the instructions, the computer is enabled to perform the method provided in the first aspect.

According to an eleventh aspect, this application further provides a computer-readable storage medium. The computer-readable storage medium stores a computer program or instructions. When a computer reads and executes the computer program or the instructions, the computer is enabled to perform the method provided in the second aspect.

According to a twelfth aspect, this application further provides a computer program product. When the computer program product runs on a computer, the computer is enabled to perform the method provided in the first aspect.

According to a thirteenth aspect, this application further provides a computer program product. When the computer program product runs on a computer, the computer is enabled to perform the method provided in the second aspect.

For beneficial effects of the second aspect to the thirteenth aspect, refer to descriptions of beneficial effects of the first aspect. Details are not described herein again.

DESCRIPTION OF EMBODIMENTS

Figure 1:
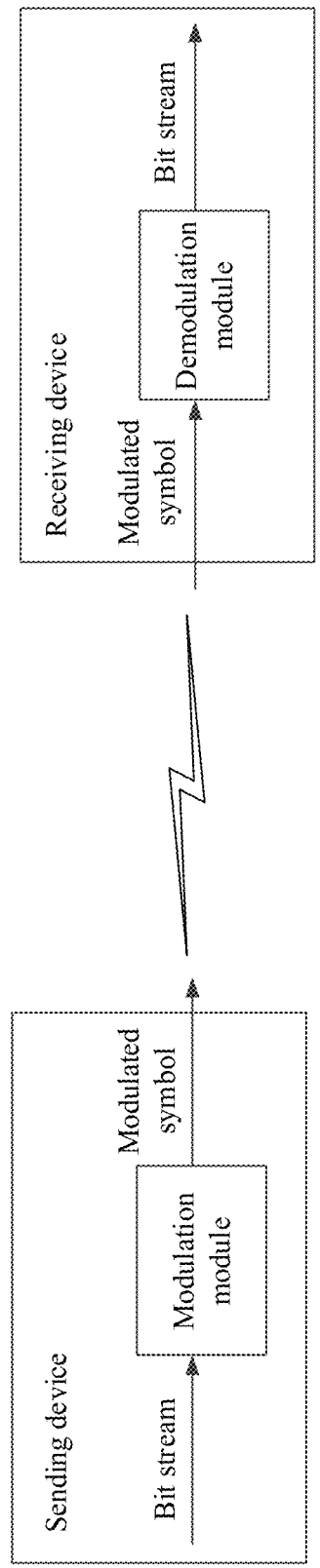
FIG. 1 is a schematic diagram of communication between a sending device and a receiving device according to an embodiment of this application.

Before being transmitted over an actual channel, baseband signals need to be modulated to a higher frequency to resist attenuation caused during transmission over the actual channel. Therefore, refer to FIG. 1. A process in which a sending device sends information to a receiving device includes: The sending device modulates an actually to-be-transmitted bit stream, to obtain a modulated signal (referred to as a modulated symbol) suitable for transmission; and the receiving device performs demodulation (an inverse process of modulation) on a received signal that passes through the actual channel, to obtain the bit stream transmitted by the sending device.

The following first describes related concepts in embodiments of this application.

(1) Bit Stream

A bit stream is an input signal of a modulation module (for example, a modulator) in the sending device.

A bit stream is a signal that includes information and that is to be transmitted by the sending device. The bit stream may also be referred to as a bit sequence. The "information" included in the signal that includes "information" herein may be a service data packet generated when the sending device executes a service. That "the sending device executes a service" may include: The sending device runs various application programs. For example, in a scenario in which the sending device runs a WeChat™ application to make a voice call, the "information" may be a voice data packet. In other words, the bit stream is a signal including the voice data packet. For another example, in a scenario in which the sending device runs an SMS message application, and a user edits SMS message content and sends the SMS message content to a contact, the "information" may be text information or the like. In other words, the bit stream is a signal including the text information.

It should be noted that the "bit stream" in this specification may also be referred to as a "to-be-processed signal", a "to-be-sent signal", a "to-be-modulated signal", or the like, provided that the "bit stream" represents the foregoing meanings. The name is not limited in this application.

In some embodiments, the bit stream is a signal obtained by performing channel coding on a signal that includes information and that is generated by the sending device. In other words, an input signal of the modulation module is a signal obtained through channel coding (bit stream). The process of channel coding is not described in detail in this application.

(2) Modulation

Modulation means to perform modulation on bit streams by a modulation module. To be specific, the bit streams are modulated into symbols suitable for transmission over actual channels.

Constellation mapping is a signal modulation mode. Constellation mapping may be understood as mapping bit streams to points on a complex plane. For example, every n bits (where n is also referred to as a modulation order, and n is greater than or equal to 2) in a bit stream may be mapped to a point on the complex plane. The point on the complex plane has a higher frequency, and is suitable for transmission on actual channels.

(3) Modulated Symbol

The modulated symbol is an output symbol obtained by modulating a bit stream by the modulation module.

A value of the modulated symbol is a point on a complex plane. It is assumed that a horizontal axis of the complex plane is a real part, and a vertical axis is an imaginary part. Therefore, coordinates of the point may be represented as (a+bi), a modulus value of a vector (a vector from the center of the complex plane to the point) corresponding to the point is $$\sqrt[2]{a^2+b^2},$$

and a phase is arctan (b/a).

It should be noted that, in this specification, the output signal obtained by modulating the bit stream by the modulation module is merely referred to as a modulated symbol, or may be referred to as a modulated signal or may have another name. This is not limited in embodiments of this application.

(4) Demodulation

After the sending device modulates the bit stream to obtain the modulated symbol, the modulated symbol is transmitted over an actual channel, and the receiving device performs signal detection on the actual channel. When detecting a signal, the receiving device demodulates the signal to obtain a bit stream. The bit stream is a signal that includes information and that is sent by the sending device, for example, the voice data packet or text information in the foregoing example. It should be noted that this process is an inverse process of signal modulation, that is, restoring the modulated symbol to the bit stream.

The foregoing explains the related concepts in embodiments of this application. The following briefly describes a constellation diagram.

Currently, most common constellation diagrams include pulse amplitude modulation (PAM) in one-dimensional real number space, quadrature amplitude modulation (QAM) in two-dimensional real number space, phase shift keying (PSK) modulation, and the like.

When constellation mapping is performed on a bit stream, every n bits in the bit stream may be mapped to a constellation point. In other words, one constellation point represents an n-bit bit stream, where n is referred to as a modulation order. A QAM constellation diagram is used as an example. Different modulation orders n correspond to different QAM constellation diagrams. To be specific, quantities of constellation points in the constellation diagrams are different. Generally, when the modulation order is n, a quantity of constellation points in a corresponding constellation diagram is $Y=2^n$. The following provides several examples.

1. If the modulation order n=2, a quantity of constellation points in a constellation diagram is $Y=2^2=4$. To be specific, every two bits in a bit stream are mapped to one constellation point. In other words, one constellation point represents a 2-bit bit stream. For example, a quadrature phase shift keying (QPSK) constellation diagram includes 4 constellation points.

2. If the modulation order n=4, a quantity of constellation points in a constellation diagram is $Y=2^4=16$. To be specific, every four bits in a bit stream are mapped to one constellation point. In other words, one constellation point represents a 4-bit bit stream. For example, 16QAM includes 16 constellation points.

3. If the modulation order n=6, a quantity of constellation points in a constellation diagram is $Y=2^6=64$. To be specific, every six bits in a bit stream are mapped to one constellation point. In other words, one constellation point represents a 6-bit bit stream. For example, 64QAM includes 64 constellation points.

5. If the modulation order n=8, a quantity of constellation points in a constellation diagram is $Y=2^8=256$. To be specific, every eight bits in a bit stream are mapped to one constellation point. In other words, one constellation point represents an 8-bit bit stream.

6. If the modulation order n=10, a quantity of constellation points in a constellation diagram is $Y=2^{10}=1024$. To be specific, every 10 bits in a bit stream are mapped to one constellation point. In other words, one constellation point represents a 10-bit bit stream.

Figure 2:
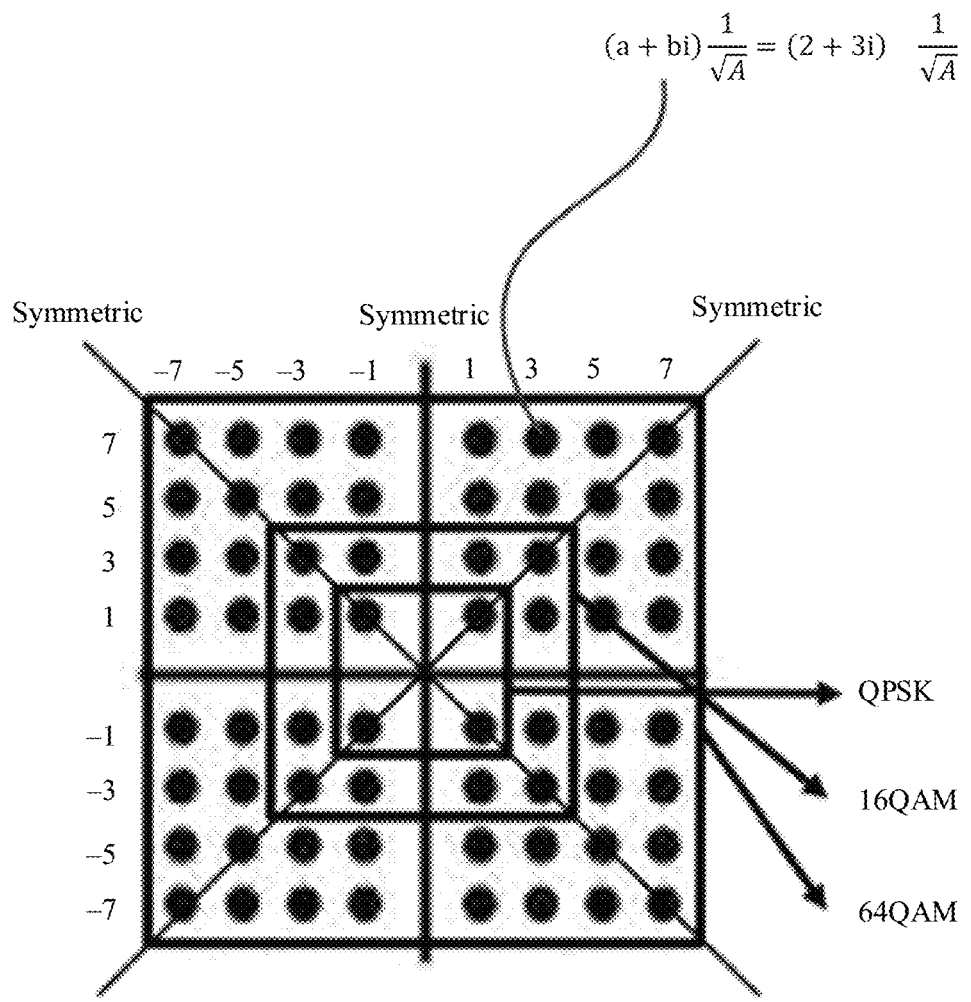
FIG. 2 is a schematic diagram of a QAM constellation diagram.
Figure 3:
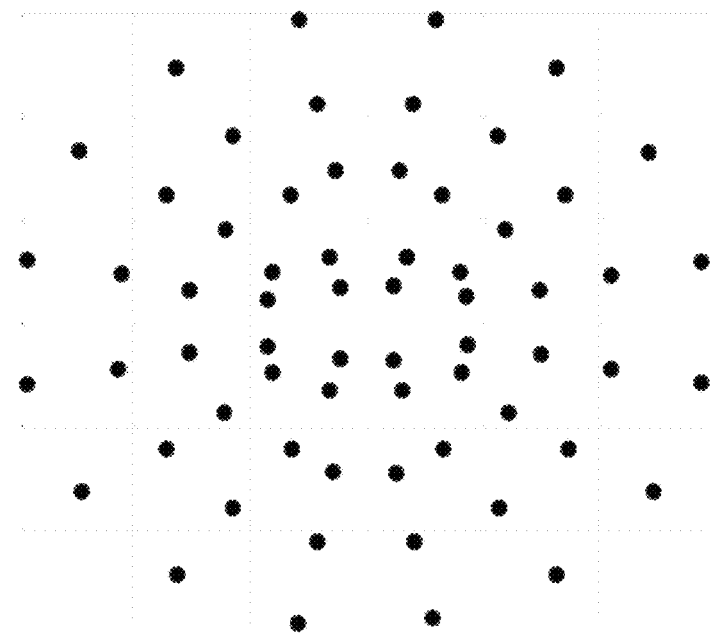
FIG. 3 is a schematic diagram of a non-uniform constellation diagram.

FIG. 2 is a schematic diagram of a plurality of constellation diagrams. The QPSK constellation diagram includes four constellation points, the 16QAM constellation diagram includes 16 constellation points, the 64QAM constellation diagram includes 64 constellation points. Constellation points in each constellation diagram are evenly distributed. In addition to such constellation diagrams with evenly distributed constellation points, there is also a constellation (non-uniform constellation, NUC) diagram with non-uniformly distributed constellation points. FIG. 3 is a schematic diagram of an NUC diagram.

Embodiments of this application may be applied to a 3rd Generation Partnership Project (3GPP) or 4th generation (4G) communication system, for example, long term evolution (LTE), or may be applied to a 5th generation (5G) communication system, for example, 5G new radio (NR), or may be applied to various future communication systems.

Embodiments of this application may be further applied to a standard communication system of a technical standard such as the Institute of Electrical and Electronics Engineers (IEEE) 802.11, for example, the IEEE 802.11ax standard, or a next-generation or a further next-generation standard of the IEEE 802.11ax standard. This is not limited in embodiments of this application.

Figure 4:
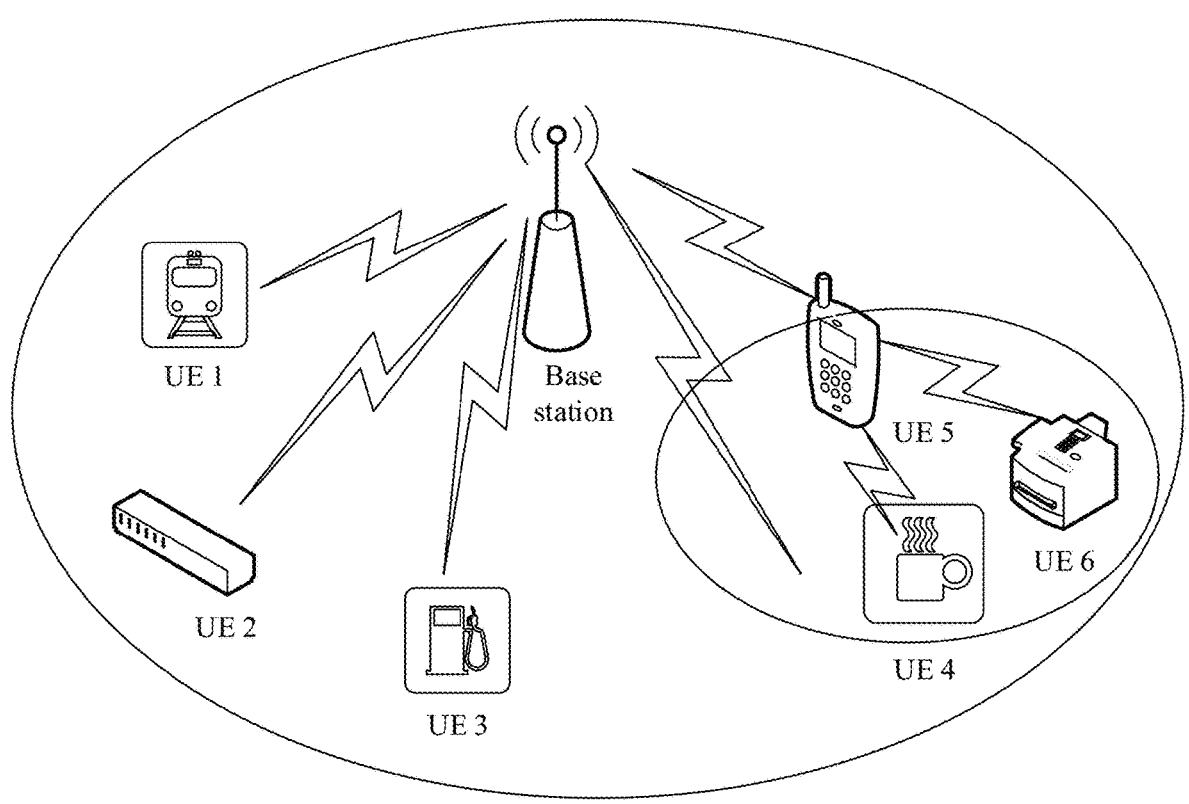
FIG. 4 is a schematic diagram of a communication system according to an embodiment of this application.

FIG. 4 is a schematic diagram of a communication system according to an embodiment of this application. The communication system includes a plurality of terminal devices and a network device configured to serve the plurality of terminal devices.

The following describes the terminal device and the network device.

The terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal device may communicate with a core network through a radio access network (RAN), and exchange a voice or data with the RAN, or interact a voice and data with the RAN. The terminal device may include user equipment (UE), a wireless terminal, a mobile terminal, a device-to-device (D2D) communication terminal, a vehicle-to-everything (V2X) terminal, a machine-to-machine/machine type communication (M2M/MTC) terminal, an internet of things (IoT) terminal, a subscriber unit, a subscriber station, a mobile station, a remote station, an access point, a remote terminal, an access terminal, a user terminal, a user agent, a user device, or the like. For example, the terminal device may include a mobile phone (or referred to as a "cellular" phone), a computer with a mobile terminal, or a portable, pocket-sized, handheld, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminals. For example, the vehicle-mounted terminals are also referred to as on-board units (OBUs). In embodiments of this application, the terminal device may further include a relay (relay). Alternatively, it is understood as that any device that can perform data communication with a base station may be considered as a terminal device.

The network device includes, for example, an access network (AN) device such as a base station (for example, an access point), and may be a device that communicates with a wireless terminal through an air interface by using one or more cells in an access network. Alternatively, for example, the network device in a vehicle-to-everything (V2X) technology is a road side unit (RSU). The base station may be configured to mutually convert a received over-the-air frame and an IP packet, and serve as a router between the terminal and a remaining part of the access network. The remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolved NodeB) in a long term evolution (LTE) system or a long term evolution-advanced (LTE-A) system, or may include a next generation NodeB (next generation NodeB, gNB) in a 5th generation mobile communication technology (5th generation, 5G) new radio (NR) system (also briefly referred to as an NR system), or may include a central unit (CU) and a distributed unit (DU) in a cloud radio access network (Cloud RAN) system. This is not limited in embodiments of this application.

The network device may further include a core network device, and the core network device includes, for example, an access and mobility management function (access and mobility management function, AMF).

It may be understood that the communication system may employ a plurality of network devices capable of communicating with a plurality of UEs, but for simplicity, FIG. 4 illustrates only one network device and a plurality of UEs.

Figure 5:
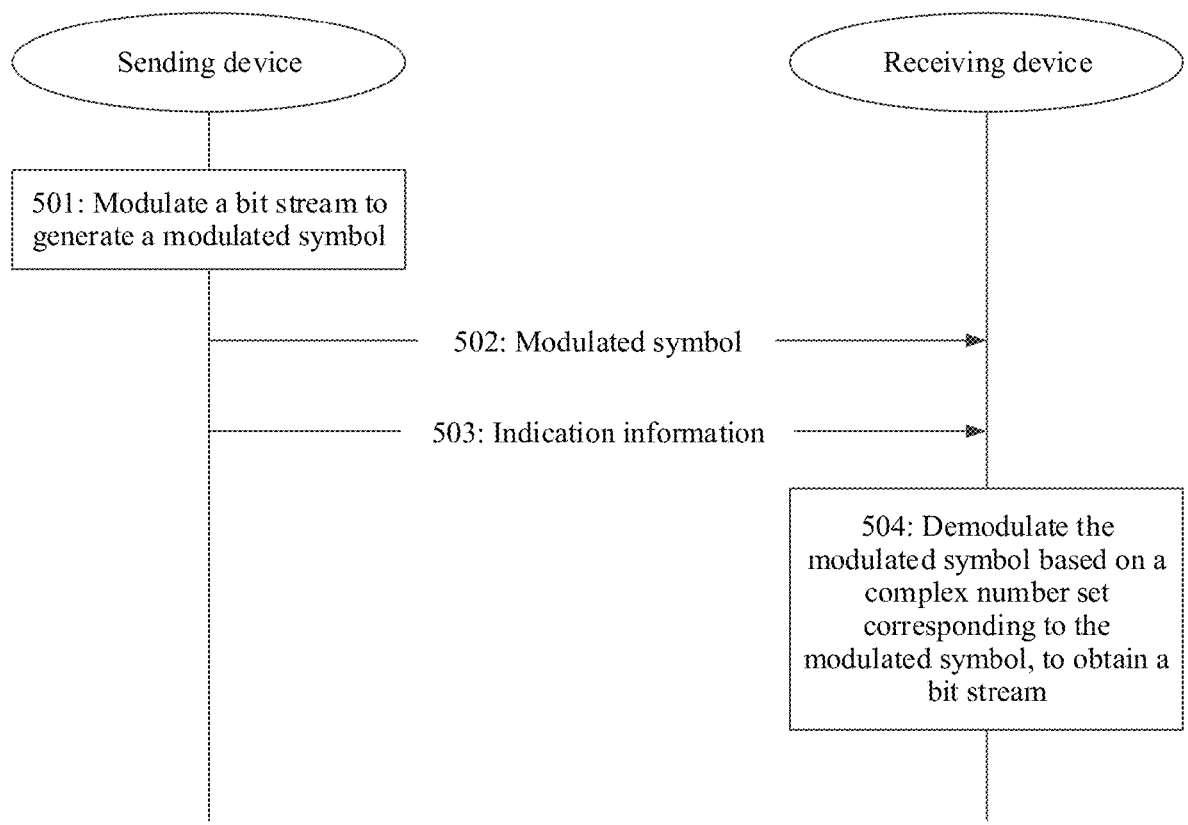
FIG. 5 is a schematic flowchart of a signal sending method according to an embodiment of this application.

FIG. 5 is a schematic flowchart of a signal sending method according to an embodiment of this application. The method relates to a communication process between a sending device and a receiving device. The method may be applied to the communication system in FIG. 4 or a similar communication system. When the method is applied to the communication system in FIG. 4, the sending device may be the network device or the terminal device in FIG. 4. When the sending device is a network device, the communication is in a downlink direction. When the sending device is a terminal device, the communication is in an uplink direction.

Step 501: The sending device modulates a bit stream to generate a modulated symbol, where a modulation order of the bit stream is n; a value of the modulated symbol is one of a plurality of complex number sets; each of the plurality of complex number sets includes $Y=2^n$ complex numbers; and a ratio of a real part of a first complex number with a largest absolute value of the real part in the complex number set to a real part of a second complex number with a smallest absolute value of the real part in the complex number set is equal to M:N, where M and N are positive integers, a greatest common divisor of M and N is 1, and M further meets at least one of the following:

when n is equal to 4, M is greater than 3 and less than 16;
when n is equal to 6, M is greater than 7 and less than 32;
when n is equal to 8, M is greater than 15 and less than 64; or
when n is equal to 10, M is greater than 31 and less than 128.

The following separately uses an example in which the modulation order n=4, 6, 8, or 10 for description.

Example 1: Modulation Order n=4

When the modulation order n is equal to 4, each complex number set includes $Y=2^n=16$ complex numbers, and each complex number set meets at least one of the following conditions:

a ratio of a real part of a first complex number whose absolute value of the real part is largest in the complex number set to a real part of a second complex number whose absolute value of the real part is smallest in the complex number set is equal to M:N;

a ratio of a real part of a first complex number whose absolute value of the real part is largest in the complex number set to an imaginary part of a second complex number whose absolute value of the imaginary part is smallest in the complex number set is equal to M:N;

a ratio of an imaginary part of a first complex number whose absolute value of the imaginary part is largest in the complex number set to an imaginary part of a second complex number whose absolute value of the imaginary part is smallest in the complex number set is equal to M:N; or a ratio of an imaginary part of a first complex number whose absolute value of the imaginary part is largest in the complex number set to a real part of a second complex number whose absolute value of the real part is smallest in the complex number set is equal to M:N.

M and N are positive integers, a greatest common divisor of M and N is 1, and M further meets: M is greater than 3 and less than 16.

FIG. 2 is used as an example. That the modulation order n=4 corresponds to 16QAM, to be specific, the complex number set includes 16 complex numbers. Each complex number is represented as $$(a+bi)\frac{1}{\sqrt{A}}, \frac{a}{\sqrt{A}}$$

is a real part, $$\frac{b}{\sqrt{A}}$$

is an imaginary part, and $$\frac{1}{\sqrt{A}}$$

is a normalization coefficient. For ease of description, in the following description, a is referred to as an integer part of the real part, and b is referred to as an integer part of the imaginary part, where a is one of $\{\pm1$ and $\pm3\}$, and b is one of $\{\pm1$ and $\pm3\}$. A maximum quantity of bits occupied by a and b is 2 bits.

In some embodiments of this application, when the modulation order n=4, the sending device increases, through bit quantization, the quantity of bits occupied by a and b. Specifically, X-bit quantization may be performed, for example, 3-bit quantization or 4-bit quantization. For example, for comparison before and after quantization, refer to the following Table 1.

TABLE 1

| Modulation order n | Quantity of modulated symbols $Y = 2^n$ | a and b in QAM | Quantity of bits (QAM) | Bit quantization X | Absolute value of a after quantization |
|---|---|---|---|---|---|
| 4 | 16 | $\{\pm1$ and $\pm3\}$ | 2 bits | 3-bit quantization | {Maximum value 7} $2^3 - 1 = 7$ |
|  |  |  |  | 4-bit quantization | {Maximum value 15} $2^4 - 1 = 15$ |

3-bit quantization is used as an example. A maximum binary value corresponding to 3-bit is 111 and a decimal value corresponding to 3-bit is 7, and a minimum binary value corresponding to 3-bit is 100 and a decimal value corresponding to 3-bit is 4. Therefore, after 3-bit quantization, an absolute value of a is an integer greater than 3 and less than or equal to 7, or an integer greater than or equal to 4 and less than 8. Optionally, an absolute value of b is an integer greater than 3 and less than or equal to 7, or an integer greater than or equal to 4 and less than 8.

Because the modulation order n=4, the complex number set includes 16 complex numbers. In the complex number set obtained through 3-bit quantization, the complex number is represented by $$(c+di)\frac{1}{\sqrt{B}},$$

and $$\frac{1}{\sqrt{B}}$$

is a normalization coefficient. c is an integer part in a real part, and an absolute value of c is an integer greater than 3 and less than or equal to 7, for example, c is one of $\{\pm5$ and $\pm7\}$. d is an integer part in an imaginary part, for example, d is one of $\{\pm5$ and $\pm7\}$.

4-bit quantization is used as an example. A maximum binary value corresponding to 4-bit is 1111 and a decimal value corresponding to 4-bit is 15, and a minimum binary value corresponding to 4-bit is 1000 and a decimal value corresponding to 4-bit is 8. Therefore, after 4-bit quantization, an absolute value of a is an integer greater than or equal to 8 and less than or equal to 15, or an integer greater than 7 and less than 16. Optionally, an absolute value of b is an integer greater than or equal to 8 and less than or equal to 15, or an integer greater than 7 and less than 16.

Because the modulation order n=4, the complex number set includes 16 complex numbers. In the complex number set obtained through 4-bit quantization, the complex number is represented by $$(c+di)\frac{1}{\sqrt{B}},$$

and $$\frac{1}{\sqrt{B}}$$

is a normalization coefficient. c is an integer part in a real part, and an absolute value of c is an integer greater than or equal to 8 and less than or equal to 15. For example, c is one of $\{\pm8$ and $\pm15\}$. d is an integer part in an imaginary part, for example, d is one of $\{\pm8$ and $\pm15\}$.

Therefore, with reference to 3-bit quantization and 4-bit quantization, for the case in which the modulation order n=4, after quantization, an absolute value of a is an integer greater than 3 and less than 16. Optionally, an absolute value of b after quantization is an integer greater than 3 and less than 16.

Example 2: Modulation Order n=6

When n is equal to 6, each complex number set includes $Y=2^n=64$ complex numbers, and each complex number set meets at least one of the following conditions:

a ratio of a real part of a first complex number whose absolute value of the real part is largest in the complex number set to a real part of a second complex number whose absolute value of the real part is smallest in the complex number set is equal to M:N;

a ratio of a real part of a first complex number whose absolute value of the real part is largest in the complex number set to an imaginary part of a second complex number whose absolute value of the imaginary part is smallest in the complex number set is equal to M:N;

a ratio of an imaginary part of a first complex number whose absolute value of the imaginary part is largest in the complex number set to an imaginary part of a second complex number whose absolute value of the imaginary part is smallest in the complex number set is equal to M:N; or a ratio of an imaginary part of a first complex number whose absolute value of the imaginary part is largest in the complex number set to a real part of a second complex number whose absolute value of the real part is smallest in the complex number set is equal to M:N.

M and N are positive integers, a greatest common divisor of M and N is 1, and M further meets: M is greater than 7 and less than 32.

FIG. 2 is used as an example. That the modulation order n=6 corresponds to 64QAM, and the complex number set includes 64 complex numbers. The complex number is represented as $$(a+bi)\frac{1}{\sqrt{A}},$$

where a is an integer part of a real part, b is an integer part of an imaginary part, and $$\frac{1}{\sqrt{A}}$$

is a normalization coefficient, where a is one of {±1±3±5 and ±7}, and b is one of {±1, ±3, ±5, and ±7}. A maximum quantity of bits occupied by a and b is 3 bits.

In some embodiments of this application, when the modulation order n=6, the sending device increases, in a manner of bit quantization, the quantity of bits occupied by a and b. Specifically, X-bit quantization may be performed, for example, 4-bit quantization or 5-bit quantization. For example, for comparison before and after quantization, refer to the following Table 2.

TABLE 2

| Modulation order n | Quantity of modulated symbols $Y = 2^n$ | a and b in QAM | Quantity of bits (QAM) | Bit quantization X | Absolute value of a after quantization |
|---|---|---|---|---|---|
| 6 | 64 | {±1, ±3, ±5, and ±7} | 3 bits | 4-bit quantization | {Maximum value 15} $2^4 - 1 = 15$ |
|  |  |  |  | 5-bit quantization | {Maximum value 31} $2^5 - 1 = 31$ |

4-bit quantization is used as an example. A maximum binary value corresponding to 4-bit is 1111 and a decimal value corresponding to 4-bit is 15, and a minimum binary value corresponding to 4-bit is 1000 and a decimal value corresponding to 4-bit is 8. Therefore, after 4-bit quantization, an absolute value of a is an integer greater than or equal to 8 and less than or equal to 15, or an integer greater than 7 and less than 16. For example, a is one of {±9, ±11, ±13, and ±15}. Optionally, an absolute value of b is an integer greater than or equal to 8 and less than or equal to 15, or an integer greater than 7 and less than 16. For example, b is one of {±9, ±11, ±13, and ±15}.

5-bit quantization is used as an example. A maximum binary value corresponding to 5-bit is 11111 and a decimal value corresponding to 5-bit is 31, and a minimum binary value corresponding to 5-bit is 10000 and a decimal value corresponding to 5-bit is 16. Therefore, after 5-bit quantization, an absolute value of a is an integer greater than or equal to 16 and less than or equal to 31, or an integer greater than 15 and less than 32. Optionally, an absolute value of b is an integer greater than or equal to 16 and less than or equal to 31, or an integer greater than 15 and less than 32.

Therefore, in combination with results of 4-bit quantization and 5-bit quantization, when the modulation order n=6, a range of the absolute value of a is an integer greater than 7 and less than 32, and optionally, a range of the absolute value of b is an integer greater than 7 and less than 32.

Example 3: Modulation Order n=8

When n is equal to 8, each complex number set includes $Y=2^n=256$ complex numbers, and each complex number set meets at least one of the following conditions:

a ratio of a real part of a first complex number whose absolute value of the real part is largest in the complex number set to a real part of a second complex number whose absolute value of the real part is smallest in the complex number set is equal to M:N;

a ratio of a real part of a first complex number whose absolute value of the real part is largest in the complex number set to an imaginary part of a second complex number whose absolute value of the imaginary part is smallest in the complex number set is equal to M:N;

a ratio of an imaginary part of a first complex number whose absolute value of the imaginary part is largest in the complex number set to an imaginary part of a second complex number whose absolute value of the imaginary part is smallest in the complex number set is equal to M:N; or a ratio of an imaginary part of a first complex number whose absolute value of the imaginary part is largest in the complex number set to a real part of a second complex number whose absolute value of the real part is smallest in the complex number set is equal to M:N.

M and N are positive integers, a greatest common divisor of M and N is 1, and M further meets: M is greater than 15 and less than 64.

QAM is used as an example. When the modulation order n=8, the complex number set includes 256 complex numbers. The complex number is represented as $$(a+bi)\frac{1}{\sqrt{A}},$$

where a is an integer part of a real part, b is an integer part of an imaginary part, and $$\frac{1}{\sqrt{A}}$$

is a normalization coefficient, where a is one of {±1, ±3, ±5, ±7, ±9, ±11, ±13, and ±15}, and b is one of {±1, ±3, ±5, ±7, ±9, ±11, ±13, and ±15}. A maximum quantity of bits occupied by a and b is 4 bits.

In some embodiments of this application, when the modulation order n=8, the sending device increases, in a manner of bit quantization, the quantity of bits occupied by a and b. Specifically, X-bit quantization may be performed, for example, 5-bit quantization or 6-bit quantization. For example, refer to the following Table 3.

TABLE 3

| Modulation order N | Quantity of modulated a and b symbols $2^N$ in QAM | Quantity of bits (QAM) | Bit quantization X | Absolute value of a after quantization |
|---|---|---|---|---|
| 8 | 256 | {±1 to ±15} | 4 bits | 5-bit quantization | {Maximum value 31} $2^5 - 1 = 31$ |
| | | | | 6-bit quantization | {Maximum value 63} $2^6 - 1 = 63$ |

5-bit quantization is used as an example. A maximum binary value corresponding to 5-bit is 11111 and a decimal value corresponding to 5-bit is 31, and a minimum binary value corresponding to 5-bit is 10000 and a decimal value corresponding to 5-bit is 16. Therefore, after 5-bit quantization, an absolute value of a is an integer greater than or equal to 16 and less than or equal to 31, or an integer greater than 15 and less than 32. Optionally, an absolute value of b is an integer greater than or equal to 16 and less than or equal to 31, or an integer greater than 15 and less than 32.

6-bit quantization is used as an example. A maximum binary value corresponding to 6-bit is 111111 and a decimal value corresponding to 6-bit is 63, and a minimum binary value corresponding to 6-bit is 100000 and a decimal value corresponding to 6-bit is 32. Therefore, after 6-bit quantization, an absolute value of a is an integer greater than or equal to 32 and less than or equal to 63, or an integer greater than 31 and less than 64. Optionally, an absolute value of b is an integer greater than or equal to 32 and less than or equal to 63, or an integer greater than 31 and less than 64.

Therefore, in combination with 5-bit quantization and 6-bit quantization, when the modulation order n=8, the absolute value of a is an integer greater than 15 and less than 64, and optionally, the absolute value of b is an integer greater than 15 and less than 64.

Example 4: Modulation Order n=10

When n is equal to 10, each complex number set includes 1024 complex numbers, and each complex number set meets at least one of the following conditions:
a ratio of a real part of a first complex number whose absolute value of the real part is largest in the complex number set to a real part of a second complex number whose absolute value of the real part is smallest in the complex number set is equal to M:N;
a ratio of a real part of a first complex number whose absolute value of the real part is largest in the complex number set to an imaginary part of a second complex number whose absolute value of the imaginary part is smallest in the complex number set is equal to M:N; a ratio of an imaginary part of a first complex number whose absolute value of the imaginary part is largest in the complex number set to an imaginary part of a second complex number whose absolute value of the imaginary part is smallest in the complex number set is equal to M:N; or
a ratio of an imaginary part of a first complex number whose absolute value of the imaginary part is largest in the complex number set to a real part of a second complex number whose absolute value of the real part is smallest in the complex number set is equal to M:N.

M and N are positive integers, a greatest common divisor of M and N is 1, and M further meets: M is greater than 31 and less than 128.

QAM is used as an example. When the modulation order n=10, the complex number set includes 1024 complex numbers. The complex number is represented as $$(a+bi)\frac{1}{\sqrt{A}},$$

where a is
an integer part of a real part, b is an integer part of an imaginary part, and $$\frac{1}{\sqrt{A}}$$

is a normalization coefficient, where a is one of {±1, ±3, ±5, ±7, ±9, ±11, ±13, ±15, ±17, ±19, ±21, ±23, ±25, ±27, ±29, and ±31}, and b is one of {±1, ±3, ±5, ÷7, ±9, ±11, ±13, ±15, ±17, ±19, ±21, ±23, ±25, ±27, ±29, and ±31}. A maximum quantity of bits occupied by a and b is 5 bits.

In this embodiment of this application, the sending device increases, in a manner of bit quantization, the quantity of bits occupied by a and b. Specifically, X-bit quantization may be performed, for example, 6-bit quantization or 7-bit quantization. For example, refer to the following Table 4.

TABLE 4

| Modulation order n | Quantity of modulated a and b symbols $2^n$ in QAM | Quantity of bits (QAM) | Bit quantization X | Absolute value of a after quantization |
|---|---|---|---|---|
| 10 | 1024 | {±1 to ±15} | 5 bits | 6-bit quantization | {Maximum value 63} $2^6 - 1 = 63$ |
| | | | | 7-bit quantization | Maximum value 127} $2^7 - 1 = 127$ |

6-bit quantization is used as an example. A maximum binary value corresponding to 6-bit is 111111 and a decimal value corresponding to 6-bit is 63, and a minimum binary value corresponding to 6-bit is 100000 and a decimal value corresponding to 6-bit is 32. Therefore, after 6-bit quantization, an absolute value of a is an integer greater than or equal to 32 and less than or equal to 63, or an integer greater than 31 and less than 64. Optionally, an absolute value of b is an integer greater than or equal to 32 and less than or equal to 63, or an integer greater than 31 and less than 64.

7-bit quantization is used as an example. A maximum binary value corresponding to 7-bit is 1111111 and a decimal value corresponding to 7-bit is 127, and a minimum binary value corresponding to 7-bit is 1000000 and a decimal value corresponding to 7-bit is 64. Therefore, after 7-bit quantization, an absolute value of a is an integer greater than or equal to 64 and less than or equal to 127, or an integer greater than 63 and less than 128. Optionally, an absolute value of b is an integer greater than or equal to 64 and less than or equal to 127, or an integer greater than 63 and less than 128.

Therefore, in combination with 6-bit quantization and 7-bit quantization, when the modulation order n=10, after quantization, the absolute value of a is an integer greater than 31 and less than 128, and optionally, the absolute value of b is an integer greater than 31 and less than 128.

The following describes a complex number set by using an example in which the modulation order n=6 and 4-bit quantization are used. Refer to the following Table 5. Table 5 shows a complex number set obtained through 4-bit quantization when the modulation order n=6.

TABLE 5

| | X = 4 |
|---|---|
| Real part of a complex number | 0.1971, 0.2956, 0.1971, 0.2956, 0.3941, 0.3941, 0.2956, 0.5912, 0.2956, 0.7883, 0.1971, 0.5912, 1.4780, 1.2809, 1.0839, 0.8868, −0.1971, −0.2956, −0.1971, −0.2956, −0.3941, −0.3941, −0.2956, −0.5912, 0.2956, −0.7883, −0.1971, −0.5912, −1.4780, −1.2809, −1.0839, −0.8868, 0.1971, 0.2956, 0.1971, 0.2956, 0.3941, 0.3941, 0.2956, 0.5912, 0.2956, 0.7883, 0.1971, 0.5912, 1.4780, 1.2809, 1.0839, 0.8868, −0.1971, −0.2956, −0.1971, −0.2956, −0.3941, −0.3941, −0.2956, −0.5912, 0.2956, −0.7883, −0.1971, −0.5912, −1.4780, −1.2809, −1.0839, −0.8868 |
| Imaginary part of the complex number | 0.3941, 0.3941, 0.5912, 0.5912, 0.1971, 0.2956, 0.0985, 0.2956, 1.4780, 1.2809, 1.0839, 0.8868, 0.2956, 0.7883, 0.1971, 0.5912, 0.3941, 0.3941, 0.5912, 0.5912, 0.1971, 0.2956, 0.0985, 0.2956, 1.4780, 1.2809, 1.0839, 0.8868, 0.2956, 0.7883, 0.1971, 0.5912, −0.3941, −0.3941, −0.5912, −0.5912, −0.1971, −0.2956, −0.0985, −0.2956, −1.4780, −1.2809, −1.0839, −0.8868, −0.2956, −0.7883, −0.1971, −0.5912, −0.5912, −0.3941, −0.3941, −0.5912, −0.5912, −0.1971, −0.2956, −0.0985, −0.2956, 1.4780, −1.2809, −1.0839, −0.8868, −0.2956, −0.7883, −0.1971, −0.5912 |

According to the foregoing example 2, when the modulation order n=6, the complex number set meets that a ratio of a real part of a first complex number with a largest absolute value of the real part to a real part of a second complex number with a smallest absolute value of the real part in the complex number set is equal to M:N, where M and N are positive integers, a greatest common divisor of M and N is 1, and M further meets: M is greater than 7 and less than 32.

Refer to Table 5. The real part of the complex number has 64 values, where a maximum absolute value of the real part is 1.4780, a minimum absolute value of the real part is 0.1971, and a ratio of the maximum absolute value of the real part to the minimum absolute value of the real part is 1.4780/0.1971. The ratio is not greater than 15:2, that is, M=15, meeting the condition that M is greater than 7 and less than 32.

In some embodiments of this application, the complex number set is determined by the sending device based on a modulation and coding scheme. Different complex number sets may be generated based on different modulation and coding schemes. For example, the complex number set is a first complex number set when the modulation and coding scheme is a first modulation and coding scheme; or the complex number set is a second complex number set when the modulation and coding scheme is a second modulation and coding scheme.

The modulation and coding scheme is a modulation and coding scheme (modulation and coding scheme, MCS). The following Table 6 shows a plurality of MCSs.

TABLE 6

| MCS index IMCS | Modulation order Qm | Target code rate Rx [1024] (Quantity of data bits transmitted per unit time) | Spectral efficiency (Spectral efficiency) |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved | |
| 30 | 4 | Reserved | |
| 31 | 6 | Reserved | |

In Table 6, the first column is the MCS index for identifying different MCSs, the second column is the modulation order, the third column is the quantity of data bits transmitted per unit time, namely, a target code rate, and the fourth column is the spectral efficiency. It can be learned from the first column and the second column that one MCS index corresponds to one MCS, and a same modulation order may correspond to a plurality of MCSs. In other words, a plurality of MCSs may correspond to a same modulation order.

In some embodiments of this application, the first complex number set generated based on a first MCS and the second complex number set generated based on a second MCS may correspond to a same modulation order. In other words, a same modulation order may correspond to a plurality of complex number sets. The modulation order n=6 is still used as an example. Refer to the foregoing Table 6, the modulation order 6 corresponds to a plurality of MCSs, and it is assumed that the modulation order 6 corresponds to four complex number sets. Refer to the following Table 7.

TABLE 7

| Modulation and coding scheme (MCS) | Modulated symbol set (X = 4) | Modulated symbol set (X = 5) |
|---|---|---|
| Modulation order 6, target code rate 466/1024 Modulation order 6, target code rate 517/1024 Modulation order 6, target code rate 616/1024 | First complex number set | Fifth complex number set |

TABLE 7-continued

| Modulation and coding scheme (MCS) | Modulated symbol set (X = 4) | Modulated symbol set (X = 5) |
|---|---|---|
| Modulation order 6, target code rate 567/1024 | Second complex number set | Sixth complex number set |
| Modulation order 6, target code rate 666/1024 | | |
| Modulation order 6, target code rate 719/1024 | Third complex number set | Seventh complex number set |
| Modulation order 6, target code rate 772/1024 | Fourth complex number set | Eighth complex number set |
| Modulation order 6, target code rate 822/1024 | | |

It can be learned with reference to Table 6 and Table 7 that, the modulation order n=6 corresponds to a plurality of MCSs, when X=4, the modulation order corresponds to four complex number sets, or when X=5, the modulation order corresponds to four complex number sets.

Therefore, a same modulation order n may correspond to a plurality of complex number sets. However, in currently commonly used QAM, one modulation order n corresponds to one complex number set. Therefore, this application is more flexible than QAM.

In some embodiments of this application, when the first complex number set generated based on the first MCS and the second complex number set generated based on the second MCS correspond to a same modulation order, the first complex number set and the second complex number set meet the following conditions:

The following still uses an example in which the modulation order n=6 for description.

Figure 6:
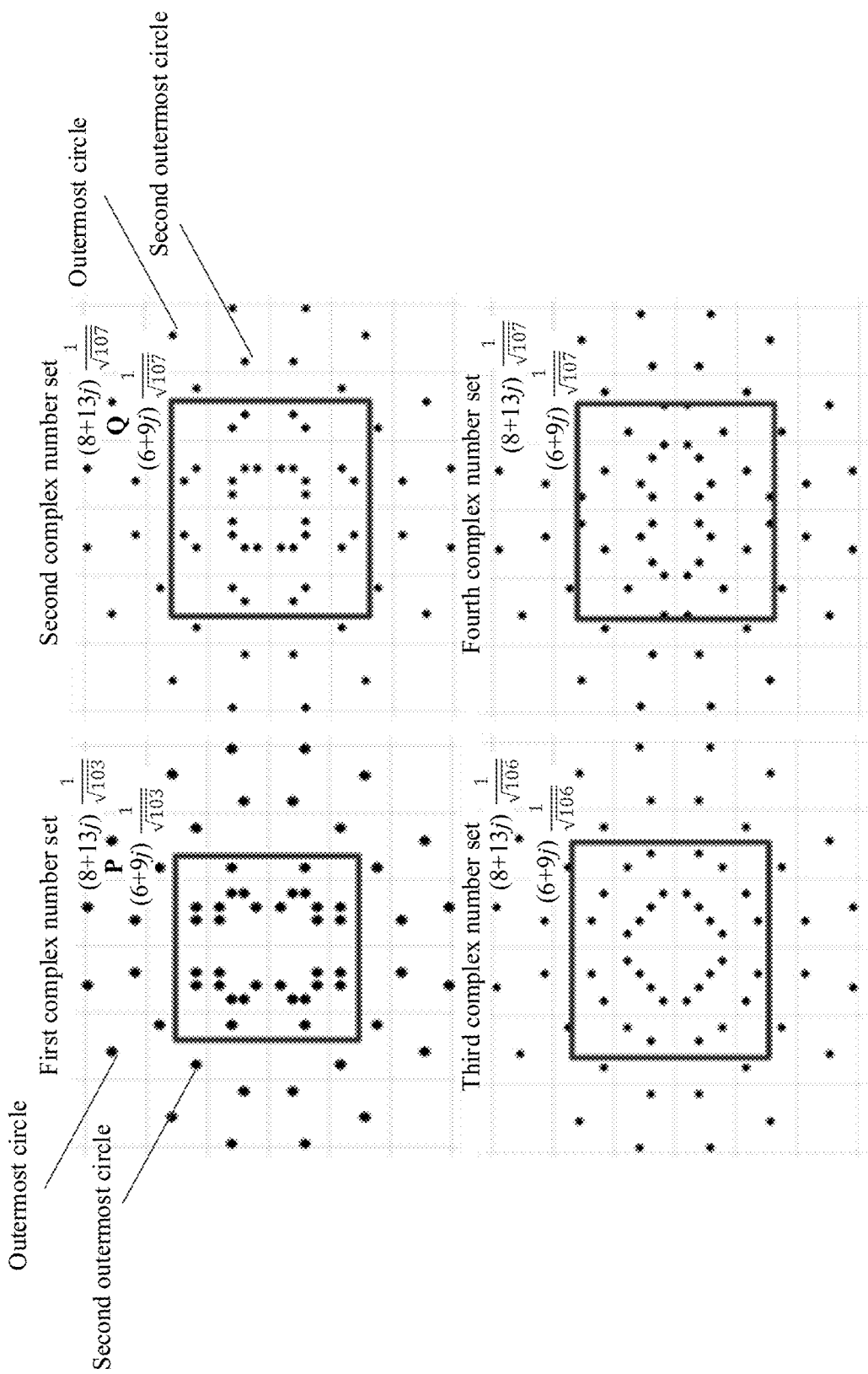
FIG. 6 is a schematic diagram of a plurality of complex number sets according to an embodiment of this application.

FIG. 6 is a constellation diagram corresponding to the first complex number set to the fourth complex number set in Table 7. The first complex number set, the second complex number set, the third complex number set, and the fourth complex number set each include Y=64 complex numbers.

In the foregoing condition (1), that the values obtained by multiplying the K complex numbers in the first complex number set by the real number A are respectively equal to the values obtained by multiplying the K complex numbers in the second complex number set by the real number B includes: a value obtained by multiplying a first complex number in the K complex numbers in the first complex number set by the real number A is equal to a value obtained by multiplying a second complex number in the K complex numbers in the second modulated symbol set by the real number B, where the first complex number is any one of the K complex numbers.

In some embodiments, the K complex numbers in the first complex number set meet: when the modulation order n=6, K=32.

In some other embodiments, the K complex numbers in the first complex number set further meet: a modulus value of any complex number in the K complex numbers in the first complex number set is greater than a modulus value of any complex number in the Y-K complex numbers in the first complex number set. In other words, the K complex numbers in the first complex number set are complex numbers whose complex number modulus values are larger.

In some embodiments, the K complex numbers in the second complex number set meet: when the modulation order n=6, K=32.

In some other embodiments, a modulus value of any complex number in the K complex numbers in the second modulated symbol set is greater than a modulus value of any complex number in the Y-K complex numbers in the second modulated symbol set. In other words, the K complex numbers in the second modulated symbol set are complex numbers whose complex number modulus values are larger.

Still refer to FIG. 6. The first complex number set and the second complex number set are used as examples for description.

There are a total of 32 constellation points outside the K complex numbers in the first complex number set, that is, outside a block. There are a total of 32 constellation points outside the K complex numbers in the second complex number set, that is, outside a block.

A constellation point P outside the block in the first complex number set is represented as $$(8+13i)\frac{1}{\sqrt{103}},$$

and $$\frac{1}{\sqrt{103}}$$

is a normalization coefficient.

A constellation point Q outside the block in the second complex number set is represented as $$(8+13i)\frac{1}{\sqrt{107}},$$

and $$\frac{1}{\sqrt{107}}$$

is a normalization coefficient.

The constellation point P is multiplied by the real number A (namely, $$\frac{1}{\sqrt{103}})$$

to obtain (8+13i), and the constellation point Q is multiplied by the real number B (namely, $$\frac{1}{\sqrt{107}})$$

to obtain (8+13i). Therefore, the value obtained by multiplying the constellation point P by the real number A is equal to the value obtained by multiplying the constellation point P by the real number B.

For the foregoing condition (2): Y-K complex numbers in the first complex number set other than the K complex numbers are not equal to values obtained by multiplying Y-K complex numbers in the second complex number set other than the K complex numbers by any non-zero real number.

The first complex number set and the second complex number set in FIG. 6 are still used as an example. A layout of constellation points enclosed by the block in the first complex number set is different from a layout of constellation points enclosed by the block in the second complex number set. Specifically, values obtained by multiplying the constellation points enclosed by the block in the first complex number set by any non-zero real number are different from values obtained by multiplying the constellation points enclosed by blocks in the second complex number set by the non-zero real number.

In some embodiments, a ratio of a modulus value of a complex number in first P complex numbers to a modulus value of a complex number in K-P complex numbers in the first complex number set other than the P complex numbers is equal to Q, where the first P complex numbers are numbers, in the K complex numbers, obtained by arranging modulus values of the K complex numbers in the first complex number set in descending order, Q is a positive number greater than 1, and Q further meets: when n is equal to 6, Q is greater than 1.34 and less than 1.42. A ratio of a modulus value of a complex number in first P complex numbers to a modulus value of a complex number in K-P complex numbers in the second complex number set other than the P complex numbers is equal to Q, where the first P complex numbers are numbers, in the K complex numbers, obtained by arranging modulus values of the K complex numbers in the second complex number set in descending order, Q is a positive number greater than 1, and Q further meets: when n is equal to 6, Q is greater than 1.34 and less than 1.42.

FIG. 6 is still used as an example. The K complex numbers in the first complex number set are complex numbers outside the block, the first P complex numbers are complex numbers at the outermost circle (16 in total), the K-P complex numbers are complex numbers at the second outermost circle (16 in total), a ratio of a modulus value of a complex number at the outermost circle to a modulus value of a complex number at the second outermost circle is $$Q, \text{ where } Q = \frac{\sqrt{(8^2 + 13^2)}}{\sqrt{(6^2 + 9^2)}},$$

Q is a positive number greater than 1, and Q is greater than 1.34 and less than 1.42. $1.34 \approx \sqrt{1.8}$; and $1.42 \approx \sqrt{2}$.

Similarly, the K complex numbers in the second complex number set are complex numbers outside the block, the first P complex numbers are complex numbers at the outermost circle (16 in total), the K-P complex numbers are complex numbers at the second outermost circle (16 in total), a ratio of a modulus value of a complex number at the outermost circle to a modulus value of a complex number at the second outermost circle is $$Q, \text{ where } Q = \frac{\sqrt{(8^2 + 13^2)}}{\sqrt{(6^2 + 9^2)}},$$

Q is a positive number greater than 1, and Q is greater than 1.34 and less than 1.42.

In some embodiments of this application, a same modulation order n may correspond to a plurality of complex number sets, and outer circles in the plurality of complex number sets may be nested to each other. Four complex number sets corresponding to the modulation order n=6 shown in FIG. 6 are used as an example. The four complex number sets have same parts. For example, integer parts of real parts at two outermost circles in the four complex number sets are respectively equal, and integer parts of imaginary parts are respectively equal. Herein, the integer part of the real part is a value obtained by multiplying the real number by a corresponding normalization coefficient, and the integer part of the imaginary part is a value obtained by multiplying the imaginary part by the normalization coefficient. If the complex number is represented by (I+Qi) $1/\sqrt{C}$, the integer part of the real part is I, and the integer part of the imaginary part is Q.

Therefore, each complex number set may be stored in two parts. An integer part I of a real part and an integer part Q of an imaginary part of each complex number in the complex number set is stored in a first part, and a normalization coefficient corresponding to the complex number set is stored in a second part. In this case, same integers exist in first parts corresponding to the four complex number sets. For example, integer parts I of real parts of complex numbers in the two outer circles of a first complex number set is equal to integer parts I of real parts of complex numbers in two outer circles of a second complex number set (or a third complex number set or a fourth complex number set).

In the following, the modulation order n=6 and 4-bit quantization are used as an example. Four complex number sets are included: the first complex number set, the second complex number set, the third complex number set, and the fourth complex number set. Refer to the following Table 9. Each complex number set is stored in a first part and a second part.

TABLE 9

| | First part | | Second part |
|---|---|---|---|
| Modulation order n = 6 (X = 4) | Complex numbers other than K complex numbers (complex numbers in a block) | K complex numbers (complex numbers outside the block) | Normalization coefficient |
| First complex number set | 2 + 4i, 3 + 4i, 2 + 6i, 3 + 6i, 4 + 2i, 4 + 3i, 3 + 1i, 6 + 3i, −2 + 4i, −3 + 4i, −2 + 6i, −3 + 6i, 4 + 2i, −4 + 3i, −3 + 1i, −6 + 3i, −2 − 4i, −3 − 4i, −2 − 6i, −3 − 6i, −4 − 2i, −4 − 3i, −3 − 1i, −6 − 3i, 2 − 4i, 3 − 4i, 2 − 6i, 3 − 6i, 4 − 2i, 4 − 3i, 3 − 1i, 6 − 3i | 3 + 15i, 8 + 13i, 2 + 11i, 6 + 9i, 15 + 3i, 13 + 8i, 11 + 2i, 9 + 6i, −3 + 15i, −8 + 13i, −2 + 11i, −6 + 9i, −15 + 3i, −13 + 8i, −11 + 2i, −9 + 6i, −3 − 15i, −8 − 13i, −9 − 6i, −3 − 15i, −8 − 13i, | 103 |
| Second complex number set | 1 + 3i, 2 + 3i, 2 + 7i, 3 + 6i, 3 + 1i, 3 + 2i, 7 + 2i, 6 + 3i, −1 + 3i, −2 + 3i, −2 + 7i, −3 + 6i, −3 + 1i, −3 + 2i, −7 + 2i, −6 + 3i, −1 − 3i, −2 − 3i, −2 − 7i, −3 − 6i, −3 − 1i, −3 − 2i, −7 − 2i, −6 − 3i, 1 − 3i, 2 − 3i, 2 − 7i, 3 − 6i, 3 − 1i, 3 − 2i, 7 − 2i, 6 − 3i | −2 − 11i, −6 − 9i, −15 − 3i, −13 − 8i, −11 − 2i, −9 − 6i, 3 − 15i, 8 − 13i, 2 − 11i, 6 − 9i, 15 − 3i, 13 − 8i, 11 − 2i, 9−6i | 104 |

TABLE 9-continued

| Modulation order n = 6 (X = 4) | First part | | Second part |
|---|---|---|---|
| | Complex numbers other than K complex numbers (complex numbers in a block) | K complex numbers (complex numbers outside the block) | Normalization coefficient |
| Third complex number set | 1 + 4i, 2 + 3i, 2 + 7i, 4 + 6i, 4 + 1i, 3 + 2i, 7 + 2i, 6 + 4i, −1 + 4i, −2 + 3i, −2 + 7i, −4 + 6i, −4 + 1i, −3 + 2i, −7 + 2i, −6 + 4i, −1 − 4i, −2 − 3i, −2 − 7i, −4 − 6i, −4 − 1i, −3 − 2i, −7 − 2i, −6 − 4i, 1 − 4i, 2 − 3i, 2 − 7i, 4 − 6i, 4 − 1i, 3 − 2i, 7 − 2i, 6 − 4i | | 106 |
| Fourth complex number set | 1 + 2i, 2 + 3i, 1 + 8i, 3 + 6i, 5 + 1i, 4 + 2i, 8 + 1i, 6 + 4i, −1 + 2i, −2 + 3i, −1 + 8i, −3 + 6i, −5 + 1i, −4 + 2i, −8 + 1i, −6 + 4i, −1 − 2i, −2 − 3i, −1 − 8i, −3 − 6i, −5 − 1i, −4 − 2i, −8 − 1i, −6 − 4i, 1 − 2i, 2 − 3i, 1 − 8i, 3 − 6i, 5 − 1i, 4 − 2i, 8 − 1i, 6 − 4i | | 107 |

It can be learned from the foregoing Table 9 that the four complex number sets are stored in the two parts. The first part is an integer part of a real part, namely, I, and an integer part of an imaginary part, namely, Q, and the second part is the normalization coefficient. First parts of the four complex number sets have a same part, and the same part only needs to be stored once, to reduce storage overheads.

In the following, the modulation order n=6 and 5-bit quantization are used as an example. Four complex number sets are included: a fifth complex number set, a sixth complex number set, a seventh complex number set, and an eighth complex number set. Refer to Table 10. Each complex number set is stored in a first part and a second part.

complex number sets have a same part, and the same part only needs to be stored once, to reduce storage overheads.

Step 502: The sending device sends the modulated symbol to the receiving device.

The sending device may further send the plurality of complex number sets to the receiving device, for example, four complex number sets corresponding to X=4, or four complex number sets corresponding to X=5, so that the receiving device demodulates the modulated symbol by using the complex number sets (complex number sets corresponding to the modulated symbol).

Step 503: The sending device sends indication information to the receiving device, where the indication information indicates the complex number set corresponding to the modulated symbol.

TABLE 10

| Modulation order n = 6 (X = 5) | First part | | Second part |
|---|---|---|---|
| | Complex numbers other than K complex numbers | K complex numbers | Normalization coefficient |
| Fifth modulated symbol set | 4 + 8i, 5 + 8i, 5 + 12i, 7 + 11i, 8 + 4i, 8 + 5i, 12 + 5i, 11 + 7i, −4 + 8i, −5 + 8i, −5 + 12i, −7 + 11i, −8 + 4i, −8 + 5i, −12 + 5i, −11 + 7i, −4 − 8i, −5 − 8i, −5 − 12i, −7 − 11i, −8 − 4i, −8 − 5i, −12 − 5i, −11 − 7i, 4 − 8i, 5 − 8i, 5 − 12i, 7 − 11i, 8 − 4i, 8 − 5i, 12 − 5i, 11 − 7i | 6 + 31i, 18 + 27i, 5 + 22i, 12 + 19i, 31 + 6i, 27 + 18i, 22 + 5i, 19 + 12i, −6 + 31i, −18 + 27i, −5 + 22i, −12 + 19i, −31 + 6i, −27 + 18i, −22 + 5i, −19 − 12i, −6 − 31i, −18 − 27i, −5 − 22i, −12 − 19i, −31 − 6i, −27 − 18i, −22 − 5i, 5 − 22i, 12 − 19i, 31 − 6i, 27 − 18i, 22 − 5i, 19 − 12i | 447 |
| Sixth modulated symbol set | 3 + 7i, 4 + 6i, 5 + 14i, 7 + 13i, 7 + 3i, 6 + 4i, 14 + 4i, 13 + 7i, −3 + 7i, −4 + 6i, −5 + 14i, −7 + 13i, −7 + 3i, −6 + 4i, −14 + 4i, −13 + 7i, −3 − 7i, −4 − 6i, −5 − 14i, −7 − 13i, −7 − 3i, −6 − 4i, −14 − 4i, −13 − 7i, 3 − 7i, 4 − 6i, 14 − 4i, 13 − 7i | −19 + 12i, −6 − 31i, −18 − 27i, −5 − 22i, −12 − 19i, −31 − 6i, −27 − 18i, −22 − 5i, −19 − 12i, 6 − 31i, 18 − 27i, 5 − 22i, 12 − 19i, 31 − 6i, 27 − 18i, 22 − 5i, 19 − 12i | 451 |
| Seventh modulated symbol set | 2 + 7i, 3 + 7i, 3 + 15i, 8 + 13i, 7 + 3i, 6 + 4i, 15 + 3i, 13 + 8i, −2 + 7i, −3 + 7i, −3 + 15i, −8 + 13i, −7 + 3i, −6 + 4i, −15 + 3i, −13 + 8i, −2 − 7i, −3 − 7i, −3 − 15i, −8 − 13i, −7 − 3i, −6 − 4i, −15 − 3i, −13 − 8i, 2 − 7i, 3 − 7i, 3 − 15i, 8 − 13i, 7 − 3i, 6 − 4i, 15 − 3i, 13 − 8i | 27 − 18i, 22 − 5i, 19 − 12i | 451 |
| Eighth modulated symbol set | 2 + 7i, 3 + 7i, 3 + 15i, 7 + 13i, 9 + 3i, 8 + 5i, 16 + 3i, 13 + 9i, −2 + 7i, −3 + 7i, −3 + 15i, −7 + 13i, −9 + 3i, −8 + 5i, −16 + 3i, −13 + 9i, −2 − 7i, −3 − 7i, −3 − 15i, −7 − 13i, −9 − 3i, −8 − 5i, −16 − 3i, −13 − 9i, 2 − 7i, 3 − 7i, 3 − 15i, 7 − 13i, 9 − 3i, 8 − 5i, 16 − 3i, 13 − 9i | | 460 |

It can be learned from the foregoing Table 10 that, when the modulation order n=6, if S-bit quantization is used, the four complex number sets are stored in the two parts. The first part is an integer part of a real part, namely, I, and an integer part of an imaginary part, namely, Q, and the second part is the normalization coefficient. First parts of the four The modulation order n corresponds to the plurality of complex number sets. The sending device modulates the bit stream to obtain the modulation symbol. A value of the modulated symbol is one of the plurality of complex number sets. The sending device needs to notify the receiving device of a specific complex number set. In this way, the receiving device may demodulate the modulated symbol by using the corresponding complex number set.

For a same modulation order n, different quantization bits X correspond to different complex number sets. Therefore, the sending device may further indicate a complex number set corresponding to which quantization bit X is used.

In some embodiments, the quantization bit X may be sent by the receiving device. For example, in the embodiment shown in FIG. 5, the method further includes the following step: The sending device receives second indication information from the receiving device, where the second indication information indicates the quantization bit X. In other words, the receiving device may notify the sending device of a maximum quantization bit that can be supported by the receiving device.

It is assumed that the receiving device indicates that X=5. The sending device may perform quantization by using X=5, or may perform quantization by using X=4. When X=4 is used for quantization, complex number sets corresponding to X=4 is indicated. When X=5 is used for quantization, complex number sets corresponding to X=5 is indicated.

The following describes a plurality of manners in which the sending device indicates, to the receiving device, the complex number sets corresponding to the modulated symbol. The following manners may be used separately or in combination.

Manner 1

The sending device sends first indication information to the receiving device, where the first indication information indicates all complex number sets corresponding to the quantization bit X corresponding to the modulated symbol. For example, the first indication information may be control information DCI, information carried in a field in the DCI, information in a field added to the DCI, or the like. This is not limited in this embodiment of this application.

When X=4, refer to Table 7, a value of the modulated symbol obtained by modulating the bit stream by the sending device is one of four complex number sets corresponding to X=4, and the first indication information may indicate the first complex number set, the second complex number set, the third complex number set, and the fourth complex number set. In other words, in manner 1, the sending device indicates, to the receiving device by using the first indication information, the four complex number sets corresponding to X=4 corresponding to the modulated symbol.

For example, when X=4, for the first indication information, refer to the following Table 11.

TABLE 11

| | X = 4 | |
|---|---|---|
| First indication information | 0 | 1 |
| Meaning | 64QAM | First/Second/Third/Fourth modulated symbol set |

When X=4, the first indication information occupies 1 bit, and the value may be 0 or 1. When the value is 0, it indicates that the complex number set corresponding to the modulated symbol is 64QAM. When the value is 1, it indicates that the complex number sets corresponding to the modulated symbol are the first complex number set, the second complex number set, the third complex number set, and the fourth complex number set corresponding to X=4.

When X=5, refer to Table 7, the value of the modulated symbol obtained by modulating the bit stream by the sending device may be the four complex number sets corresponding to X=4, or may be the four complex number sets corresponding to X=5. Therefore, when X=5, for the first indication information, refer to Table 12.

TABLE 12

| First indication information | X = 5 | | |
|---|---|---|---|
| | 0 | 1 | 2 |
| Meaning | 64QAM | First/Second/Third/Fourth complex number set | Fifth/Sixth/Seventh/Eighth complex number set |

When X=5, the first indication information occupies 2 bits, and the value may be 0 to 2. When the value is 0, it indicates that the complex number set corresponding to the modulated symbol is 64QAM. When the value is 1, it indicates that the complex number sets corresponding to the modulated symbol are the first complex number set, the second complex number set, the third complex number set, and the fourth complex number set. When the value is 2, it indicates that the complex number sets corresponding to the modulated symbol are the fifth complex number set, the sixth complex number set, the seventh complex number set, and the eighth complex number set.

Manner 2

Different from manner 1 that, a specific complex number set in the four complex number sets corresponding to X=4 corresponding to the modulated symbol may be indicated more accurately, or a specific complex number set in the four complex number sets corresponding to X=5 corresponding to the modulated symbol may be indicated more accurately.

For example, X=4. Table 7 is used as an example. It is assumed that the value of the modulated symbol obtained by modulating the bit stream by the sending device is one or more of the first complex number set to the fourth complex number set, and the first indication information may indicate the first complex number set. In an example, the first indication information indicates that the modulation order is 6, the first indication information carries a mark, and the mark indicates the first complex number set (each of the first complex number set to the fourth complex number set corresponds to a mark). Therefore, the receiving device may determine, based on the first indication information, that the modulated symbol corresponds to the first complex number set.

For example, when X=4, for the first indication information, refer to the following Table 13.

TABLE 13

| First indication information | X = 4 | | | | |
|---|---|---|---|---|---|
| | 0 | 1 | 2 | 3 | 4 |
| Meaning | 64QAM | First complex number set | Second complex number set | Third complex number set | Fourth complex number set |

When X=4, the first indication information occupies 3 bits, and the value may be 0 to 4. When the value is 0, it indicates that the complex number set corresponding to the modulated symbol is 64QAM; when the value is 1, it indicates that the complex number set corresponding to the modulated symbol is the first complex number set; when the value is 2, it indicates that the complex number set corresponding to the modulated symbol is the second complex number set; when the value is 3, it indicates that the complex number set corresponding to the modulated symbol is the third complex number set; or when the value is 4, it indicates that the complex number set corresponding to the modulated symbol is the fourth complex number set.

When X=5, Table 7 is used as an example. The value of the modulated symbol obtained by modulating the bit stream by the sending device may be one of the four complex number sets corresponding to X=4, or may be one of the four complex number sets corresponding to X=5. Assuming that the value of the modulated symbol is the first complex number set, the first indication information may indicate the first complex number set.

For example, when X=5, for the first indication information, refer to Table 14.

TABLE 14

| | | | | X = 5 | | | | | |
|---|---|---|---|---|---|---|---|---|---|
| First indication information | 0 | 1 | 2 | 3 | 4 | 5 | 6 | 7 | 8 |

| | | | | X = 5 | | | | | |
|---|---|---|---|---|---|---|---|---|---|
| Meaning | 64QAM | First complex number set | Second complex number set | Third complex number set | Fourth complex number set | Fifth complex number set | Sixth complex number set | Seventh complex number set | Eighth complex number set |

Therefore, when X=5, the first indication information occupies 4 bits, and the value may be 0 to 8. When the value is 0, it indicates that the complex number set corresponding to the modulated symbol is 64QAM; when the value is 1, it indicates that the complex number set corresponding to the modulated symbol is the first complex number set; when the value is 2, it indicates that the complex number set corresponding to the modulated symbol is the second complex number set; when the value is 3, it indicates that the complex number set corresponding to the modulated symbol is the third complex number set; or when the value is 4, it indicates that the complex number set corresponding to the modulated symbol is the fourth complex number set. When the value is 5, it indicates that the complex number set corresponding to the modulated symbol is the fifth complex number set; when the value is 6, it indicates that the complex number set corresponding to the modulated symbol is the sixth complex number set; when the value is 7, it indicates that the complex number set corresponding to the modulated symbol is the seventh complex number set; or when the value is 8, it indicates that the complex number set corresponding to the modulated symbol is the eighth complex number set.

Manner 3

The sending device sends control information DCI to the receiving device, where the DCI is scrambled by using first information, and the first information indicates all complex number sets corresponding to a quantization bit X corresponding to the modulated symbol.

When X=4, RNTI scrambling is used as an example. When CRC of the DCI sent by the sending device is scrambled by a preconfigured RNTI, QAM is indicated; or when CRC of the DCI is scrambled by a preconfigured RNTI+1, the four complex number sets corresponding to X=4 are indicated.

When X=5, RNTI scrambling is used as an example. When CRC of the DCI sent by the sending device is scrambled by a preconfigured RNTI, QAM is indicated; when CRC of the DCI is scrambled by a preconfigured RNTI+1, the four complex number sets corresponding to X=4 are indicated; or when CRC of the DCI is scrambled by a preconfigured RNTI+2, the four complex number sets corresponding to X=5 are indicated.

Manner 4

Different from manner 3 that, a specific complex number set in the four complex number sets corresponding to X=4 may be indicated more accurately, or a specific complex number set in the four complex number sets corresponding to X=4 may be indicated more accurately.

When X=4, RNTI scrambling is used as an example. When CRC of the DCI sent by the sending device is scrambled by a preconfigured RNTI, QAM is indicated; when CRC of the DCI is scrambled by a preconfigured RNTI+1, the first complex number set is indicated; when CRC of the DCI is scrambled by a preconfigured RNTI+2, the second complex number set is indicated; when CRC of the DCI is scrambled by a preconfigured RNTI+3, the third complex number set is indicated; or when CRC of the DCI is scrambled by a preconfigured RNTI+4, the fourth complex number set is indicated.

When X=5, RNTI scrambling is used as an example. When CRC of the DCI sent by the sending device is scrambled by a preconfigured RNTI, QAM is indicated; when CRC of the DCI is scrambled by a preconfigured RNTI+1, the first complex number set is indicated; when CRC of the DCI is scrambled by a preconfigured RNTI+2, the second complex number set is indicated; when CRC of the DCI is scrambled by a preconfigured RNTI+3, the third complex number set is indicated; or when CRC of the DCI is scrambled by a preconfigured RNTI+4, the fourth complex number set is indicated. When CRC of the DCI is scrambled by a preconfigured RNTI+5, the fifth complex number set is indicated; when CRC of the DCI is scrambled by a preconfigured RNTI+6, the sixth complex number set is indicated; when CRC of the DCI is scrambled by a preconfigured RNTI+7, the seventh complex number set is indicated; or when CRC of the DCI is scrambled by a preconfigured RNTI+8, the eighth complex number set is indicated.

There may be a plurality of RNTI scrambling types, for example, including a system information radio network temporary identifier (system information RNTI, SI_RNTI) scrambling type, a cell radio network temporary identifier (cell RNTI, C-RNTI) scrambling type, a cell semi-persistent radio network temporary identifier (cell semi-persistent RNTI, CS-RNTI) scrambling type, a temporary cell radio network temporary identifier (temporary cell RNTI, TC_RNTI) scrambling type, or a random access radio network temporary identifier (random access RNTI, RA-RNTI) scrambling type. This is not limited in this embodiment of this application.

Step 504: The receiving device demodulates the modulated symbol based on the complex number set indicated by the indication information, to obtain the bit stream.

It is assumed that the value of the modulated symbol obtained by modulating the bit stream by the sending device is the first complex number set corresponding to X=4, and the sending device indicates the modulated symbol corresponding to the first complex number set to the receiving device. However, in a process of transmitting the modulated symbol on an actual channel, impact such as noise is inevitably received. Consequently, the value of the modulated symbol received by the receiving device in a coordinate system deviates from a position of the first complex number set. Therefore, after receiving the modulated symbol, the receiving device determines, from the first complex number set, a complex number closest to the value of the modulated symbol, and demodulates the modulated symbol based on the complex number, to obtain the bit stream.

The following describes beneficial effects of embodiments of this application by comparing QAM with the complex number set provided in embodiments of this application.

1. When the modulation order n is the same, QAM corresponds to one complex number set. For example, the modulation order n=6 corresponds to one QAM. However, in some embodiments of this application, the modulation order n=6 corresponds to a plurality of complex number sets, and the plurality of complex number sets correspond to different MCSs. For example, when X=4, QAM corresponds to four complex number sets, and when X=5, QAM corresponds to other four complex number sets. Therefore, the complex number set in this application is designed more flexible.

2. Compared with using QAM, using the complex number set in this application has higher transmission performance. Specifically, transmission performance of the complex number set in this application and QAM under a same condition may be tested in a simulation test manner. The following provides several examples.

(1) When a condition 1 that one modulated symbol carries a bit stream with a same quantity of bits is met, in other words, at a same modulation order n, it may be determined, through simulation test, that using the complex number set in this application may reduce a demodulation threshold of the receiving device compared with using QAM. The demodulation threshold may be understood as a demodulation threshold of a modulator for an input signal. When a signal-to-noise ratio of the input signal is greater than the threshold, a demodulator demodulates the input information. The signal-to-noise ratio is a ratio of a signal to a noise.

(2) When the condition 1 that each modulated symbol carries a same quantity of bits and a condition 2 that a same demodulation threshold is used are met, it may be determined, through simulation test, that using the complex number set in this application can obtain a higher throughput and a lower block error rate compared with using QAM. Alternatively, on a premise that a same block error rate is achieved, using the complex number set in this application may reduce the signal-to-noise ratio compared with using QAM, for example, may reduce the signal-to-noise ratio by 0.5 dm to 1 dm.

3. In this application, X=4 and the modulation order n=6 are used as an example. There is a nesting relationship in a plurality of corresponding complex number sets. Each complex number set is stored in two parts. An integer part of a real part and an integer part of an imaginary part is stored in one part, and a normalization coefficient is stored in another part. First parts of the plurality of complex number sets have a same value. Therefore, only one of the first parts needs to be stored as a common part, lowering overall storage overheads.

Figure 7:
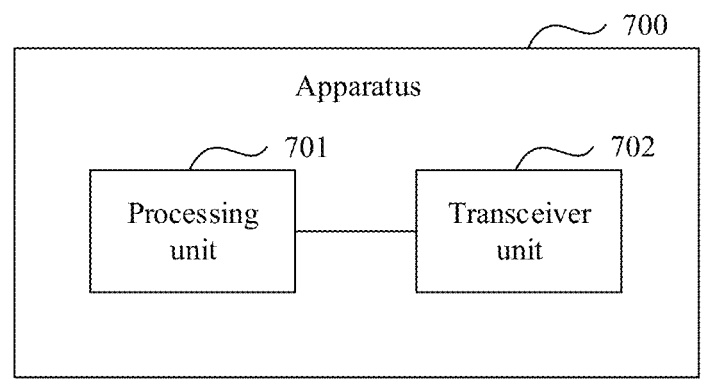
FIG. 7 is a schematic diagram of a communication apparatus according to an embodiment of this application.

FIG. 7 is a schematic diagram of a structure of a communication apparatus according to an embodiment of this application. As shown in FIG. 7, a communication apparatus 700 includes a processing unit 701 and a transceiver unit 702.

In an example, the apparatus 700 is configured to implement functions of the sending device in the foregoing method. The apparatus may be the sending device in the foregoing embodiments, or may be an apparatus, such as a chip system, in the sending device. The sending device is, for example, a network device.

Specifically, the processing unit 701 is configured to modulate a bit stream to generate a modulated symbol, where a modulation order of the bit stream is n, a value of the modulated symbol is one of a plurality of complex number sets, the complex number set includes $Y=2^n$ complex numbers, and a ratio of a real part of a first complex number with a largest absolute value of the real part in the complex number set to a real part of a second complex number with a smallest absolute value of the real part in the complex number set is equal to M:N, where M and N are positive integers, a greatest common divisor of M and N is 1, and M further meets at least one of the following:

when n is equal to 4, M is greater than 3 and less than 16;
when n is equal to 6, M is greater than 7 and less than 32;
when n is equal to 8, M is greater than 15 and less than 64; or
when n is equal to 10, M is greater than 31 and less than 128.

The transceiver unit 702 is configured to send the modulated symbol to a receiving device.

Optionally, the complex number set further meets:
a ratio of an imaginary part of a third complex number whose absolute value of the imaginary part is largest in the complex number set to an imaginary part of a fourth complex number whose absolute value of the imaginary part is smallest in the complex number set is equal to M:N.

Optionally, the processing unit 701 is further configured to determine the complex number set based on a modulation and coding scheme. The complex number set is a first complex number set when the modulation and coding scheme is a first modulation and coding scheme; or the complex number set is a second complex number set when the modulation and coding scheme is a second modulation and coding scheme. When a modulation order corresponding to the first modulation and coding scheme is equal to a modulation order corresponding to the second modulation and coding scheme, values obtained by multiplying K complex numbers in the first complex number set by a real number A are respectively equal to values obtained by multiplying K complex numbers in the second complex number set by a real number B. Y-K complex numbers in the first complex number set other than the K complex numbers are not equal to values obtained by multiplying Y-K complex numbers in the second complex number set other than the K complex numbers by any non-zero real number. The real number A and the real number B are normalization coefficients.

Optionally, a modulus value of any complex number in the K complex numbers in the first complex number set is greater than a modulus value of any complex number in the Y-K complex numbers in the first complex number set;

and/or a modulus value of any complex number in the K complex numbers in the second complex number set is greater than a modulus value of any complex number in the Y-K complex numbers in the second complex number set.

Optionally, when n is equal to 6, K is equal to 32.

Optionally, a ratio of a modulus value of a complex number in first P complex numbers to a modulus value of a complex number in K-P complex numbers in the first complex number set other than the P complex numbers is equal to Q, where the first P complex numbers are numbers, in the K complex numbers, obtained by arranging modulus values of the K complex numbers in the first complex number set in descending order, Q is a positive number greater than 1, and Q further meets the following condition: when n is equal to 6, Q is greater than 1.34 and less than 1.42; and a ratio of a modulus value of a complex number in first P complex numbers to a modulus value of a complex number in K-P complex numbers in the second complex number set other than the P complex numbers is equal to Q, where the first P complex numbers are numbers, in the K complex numbers, obtained by arranging modulus values of the K complex numbers in the second complex number set in descending order, Q is a positive number greater than 1, and Q further meets the following condition: when n is equal to 6, Q is greater than 1.34 and less than 1.42.

Optionally, the transceiver unit 702 is further configured to send indication information to the receiving device, where the indication information indicates the complex number set corresponding to the modulated symbol.

Optionally, the transceiver unit 702 is further configured to send control information DCI to the receiving device, where the DCI is scrambled by using first information, and the first information indicates the complex number set corresponding to the modulated symbol.

In an example, the apparatus 700 is configured to implement functions of the receiving device in the foregoing method. The apparatus may be the receiving device in the foregoing embodiments, or may be an apparatus, such as a chip system, in the receiving device. For example, the receiving device may be a terminal device.

Specifically, the transceiver unit 702 is configured to receive a modulated symbol from a sending device.

The processing unit 701 is configured to demodulate the modulated symbol based on a complex number set corresponding to the modulated symbol, to obtain a bit stream.

A value of the modulated symbol is one of a plurality of complex number sets, the complex number set includes $Y=2^n$ complex numbers, n is a modulation order of the bit stream, and a ratio of a real part of a first complex number with a largest absolute value of the real part in the complex number set to a real part of a second complex number with a smallest absolute value of the real part in the complex number set is equal to M:N, where M and N are positive integers, a greatest common divisor of M and N is 1, and M further meets at least one of the following: when n is equal to 4, M is greater than 3 and less than 16;

when n is equal to 6, M is greater than 7 and less than 32;
when n is equal to 8, M is greater than 15 and less than 64; or
when n is equal to 10, M is greater than 31 and less than 128.

Optionally, the complex number set further meets:
a ratio of an imaginary part of a third complex number whose absolute value of the imaginary part is largest in the complex number set to an imaginary part of a fourth complex number whose absolute value of the imaginary part is smallest in the complex number set is equal to M:N.

Optionally, the plurality of complex number sets include a first complex number set and a second complex number set, the first complex number set is determined based on a first modulation and coding scheme, and the second complex number set is determined based on a second modulation and coding scheme.

When a modulation order corresponding to the first modulation and coding scheme is equal to a modulation order corresponding to the second modulation and coding scheme, values obtained by multiplying K complex numbers in the first complex number set by a real number A are respectively equal to values obtained by multiplying K complex numbers in the second complex number set by a real number B, and Y-K complex numbers in the first complex number set other than the K complex numbers are not equal to values obtained by multiplying Y-K complex numbers in the second complex number set other than the K complex numbers by any non-zero real number, where the real number A and the real number B are normalization coefficients.

Optionally, a modulus value of any complex number in the K complex numbers in the first complex number set is greater than a modulus value of any complex number in the Y-K complex numbers in the first complex number set; and/or a modulus value of any complex number in the K complex numbers in the second complex number set is greater than a modulus value of any complex number in the Y-K complex numbers in the second complex number set.

Optionally, when n is equal to 6, K is equal to 32.

Optionally, a ratio of a modulus value of a complex number in first P complex numbers to a modulus value of a complex number in K-P complex numbers in the first complex number set other than the P complex numbers is equal to Q, where the first P complex numbers are numbers, in the K complex numbers, obtained by arranging modulus values of the K complex numbers in the first complex number set in descending order, Q is a positive number greater than 1, and Q further meets the following condition: when n is equal to 6, Q is greater than 1.34 and less than 1.42; and a ratio of a modulus value of a complex number in first P complex numbers to a modulus value of a complex number in K-P complex numbers in the second complex number set other than the P complex numbers is equal to Q, where the first P complex numbers are numbers, in the K complex numbers, obtained by arranging modulus values of the K complex numbers in the second complex number set in descending order, Q is a positive number greater than 1, and Q further meets the following condition: when n is equal to 6, Q is greater than 1.34 and less than 1.42.

Optionally, the transceiver unit 702 is further configured to receive indication information from the sending device, where the indication information indicates the complex number set corresponding to the modulated symbol.

Optionally, the transceiver unit 702 is further configured to receive control information DCI sent by the sending device, where the DCI is scrambled by using first information, and the first information indicates the complex number set corresponding to the modulated symbol.

For specific execution processes of the processing unit 701 and the transceiver unit 702, refer to the descriptions in the foregoing method embodiments. Division into the modules in this embodiment of this application is an example of division into logical functions, or may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

In another optional variation, the apparatus may be a chip system. In some embodiments of this application, the chip system may include a chip, or may include a chip and another discrete component. For example, the apparatus includes a processor and an interface, and the interface may be an input/output interface. The processor implements functions of the processing unit 701, and the interface implements functions of the transceiver unit 702. The apparatus may further include a memory. The memory is configured to store a program that may be run on the processor, and the processor implements the methods in the foregoing embodiments when executing the program.

Figure 8:
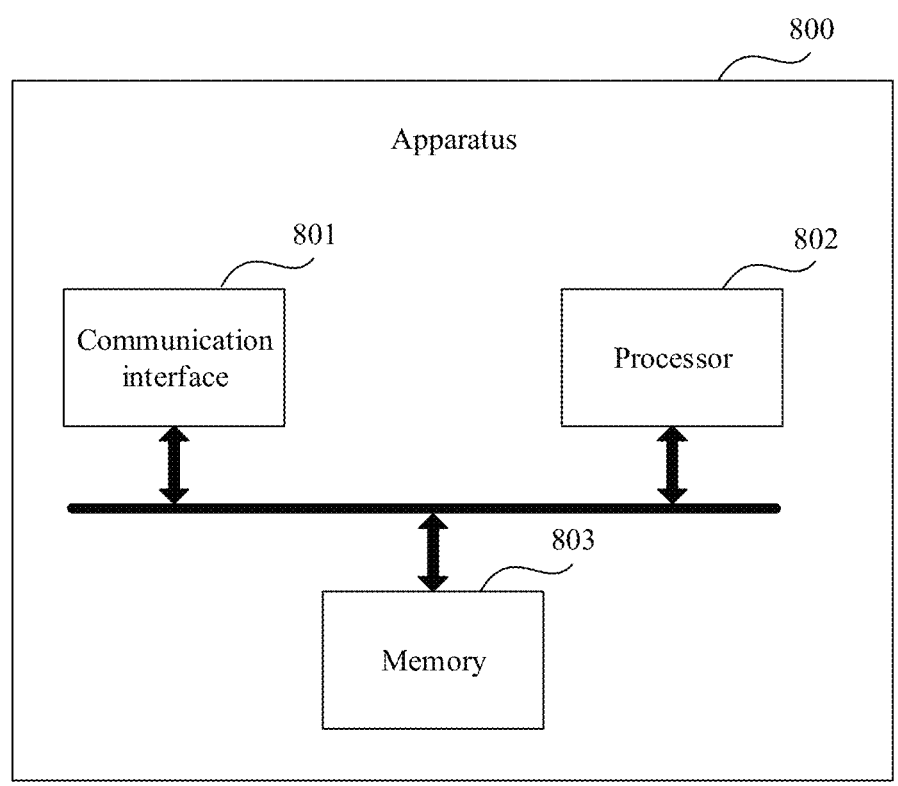
FIG. 8 is another schematic diagram of a communication apparatus according to an embodiment of this application.

Same as the foregoing idea, as shown in FIG. 8, an embodiment of this application further provides an apparatus 800. The apparatus 800 includes a communication interface 801, at least one processor 802, and at least one memory 803. The communication interface 801 is configured to communicate with another device via a transmission medium, so that an apparatus in the apparatus 800 can communicate with the another device. The memory 803 is configured to store a computer program. The processor 802 invokes a computer program stored in the memory 803, to send and receive data through the communication interface 801, and implement the method in the foregoing embodiments.

For example, when the apparatus is the sending device in the foregoing embodiments, the memory 803 is configured to store the computer program. The processor 802 invokes the computer program stored in the memory 803, to perform, through the communication interface 801, the method performed by the sending device (for example, a network device) in the foregoing embodiments. When the apparatus is the receiving device in the foregoing embodiments, the memory 803 is configured to store the computer program. The processor 802 invokes the computer program stored in the memory 803, to perform, through the communication interface 801, the method performed by the receiving device (for example, a terminal device) in the foregoing embodiments.

In some embodiments of this application, the communication interface 801 may be a transceiver, a circuit, a bus, a module, or a communication interface of another type. The processor 802 may be a general purpose processor, a digital signal processor, an application-specific integrated circuit, a field programmable gate array or another programmable logic device, a discrete gate or a transistor logic device, or a discrete hardware component, and may implement or execute methods, steps, and logic block diagrams that are disclosed in embodiments of this application. The general purpose processor may be a microprocessor, any conventional processor, or the like. The steps of the method disclosed with reference to embodiments of this application may be directly performed and completed by a hardware processor, or may be performed and completed by a combination of hardware and software modules in the processor. The memory 803 may be a non-volatile memory, for example, a hard disk drive (HDD) or a solid-state drive (SSD), or may be a volatile memory (volatile memory), for example, a random access memory (RAM). The memory is any other medium that can carry or store expected program code in a form of instructions or a data structure and that can be accessed by a computer, but is not limited thereto. The memory in some embodiments of this application may alternatively be a circuit or any other apparatus that can implement a storage function. The memory 803 is coupled to the processor 802. Couplings in some embodiments of this application are indirect couplings or communication connections between apparatuses, units, or modules, may be implemented in electronic, mechanical, or other forms, and are used for information exchange between the apparatuses, the units, or the modules. In another implementation, the memory 803 may alternatively be located outside the apparatus 800. The processor 802 may operate in collaboration with the memory 803. The processor 802 may execute program instructions stored in the memory 803. At least one of the at least one memory 803 may alternatively be included in the processor 802. A connection medium between the communication interface 801, the processor 802, and the memory 803 is not limited in this embodiment of this application. For example, in one embodiment of this application, the memory 803, the processor 802, and the communication interface 801 may be connected through a bus in FIG. 8. The bus may be classified into an address bus, a data bus, a control bus, or the like.

It may be understood that the apparatus in the embodiment shown in FIG. 8 may be implemented by the apparatus 700 shown in FIG. 7. Specifically, the processing unit 701 may be implemented by the processor 802, and the transceiver unit 702 may be implemented by the communication interface 801.

All or some of the methods in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or some of the procedures or functions according to embodiments of the present disclosure are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, a solid state disk (SSD)), or the like.

An embodiment of this application further provides a computer program product including computer instructions. When the computer program product runs on a communication apparatus, the communication apparatus is enabled to perform the method shown in FIG. 5.

An embodiment of this application further provides a communication system. The communication system includes a sending device and a receiving device. The sending device is configured to perform the steps of the sending device in the technical solution shown in FIG. 5, and the receiving device is configured to perform the steps of the receiving device in the technical solution shown in FIG. 5. The sending device may be a network device, and the receiving device may be a terminal device, that is, a downlink direction; or the sending device may be a terminal device, and the receiving device may be a network device, that is, an uplink direction.

The foregoing embodiments are merely used to describe the technical solutions of this application in detail. The descriptions of the foregoing embodiments are merely intended to help understand the method according to embodiments of the present disclosure, and shall not be construed as any limitation on embodiments of the present disclosure. Variations or replacements readily figured out by a person skilled in the art shall fall within the protection scope of embodiments of the present disclosure.

What is claimed is:

1. A signal sending method, applied to a sending device, and comprising:
    modulating a bit stream to generate a modulated symbol, wherein a modulation order of the bit stream is n, a value of the modulated symbol is one of a plurality of complex number sets, each of the plurality of complex number sets comprises $Y=2^n$ complex numbers, and a ratio of a real part of a first complex number with a largest absolute value of the real part in the complex number set to a real part of a second complex number with a smallest absolute value of the real part in the complex number set is equal to M:N, wherein M and N are positive integers, a greatest common divisor of M and N is 1, and M further meets at least one of the following:
    when n is equal to 4, M is greater than 3 and less than 16;
    when n is equal to 6, M is greater than 7 and less than 32;
    when n is equal to 8, M is greater than 15 and less than 64; or
    when n is equal to 10, M is greater than 31 and less than 128; and
    sending the modulated symbol to a receiving device.

2. The method according to claim 1, wherein each of the plurality of complex number sets further meets:
    a ratio of an imaginary part of a third complex number whose absolute value of the imaginary part is largest in the complex number set to an imaginary part of a fourth complex number whose absolute value of the imaginary part is smallest in the complex number set is equal to M:N.

3. The method according to claim 1, wherein the method further comprises:
    determining each of the plurality of complex number sets based on a modulation and coding scheme, wherein the complex number set is a first complex number set when the modulation and coding scheme is a first modulation and coding scheme; or the complex number set is a second complex number set when the modulation and coding scheme is a second modulation and coding scheme, wherein
    when a modulation order corresponding to the first modulation and coding scheme is equal to a modulation order corresponding to the second modulation and coding scheme, values obtained by multiplying K complex numbers in the first complex number set by a real number A are respectively equal to values obtained by multiplying K complex numbers in the second complex number set by a real number B, and Y-K complex numbers in the first complex number set other than the K complex numbers are not equal to values obtained by multiplying Y-K complex numbers in the second complex number set other than the K complex numbers by any non-zero real number, wherein K is an integer smaller than Y, and the real number A and the real number B are normalization coefficients.

4. The method according to claim 3, wherein
    a modulus value of any complex number in the K complex numbers in the first complex number set is greater than a modulus value of any complex number in the Y-K complex numbers in the first complex number set; and/or
    a modulus value of any complex number in the K complex numbers in the second complex number set is greater than a modulus value of any complex number in the Y-K complex numbers in the second complex number set.

5. The method according to claim 3, wherein when n is equal to 6, K is equal to 32.

6. The method according to claim 3, wherein
    a ratio of a modulus value of a complex number in first P complex numbers to a modulus value of a complex number in K-P complex numbers in the first complex number set other than the P complex numbers is equal to Q, wherein the first P complex numbers are obtained by arranging modulus values of the K complex numbers in the first complex number set in descending order, Q is a positive number greater than 1, and Q further meets the following condition:
    when n is equal to 6, Q is greater than 1.34 and less than 1.42; and
    a ratio of a modulus value of a complex number in first P complex numbers to a modulus value of a complex number in K-P complex numbers in the second complex number set other than the P complex numbers is equal to Q, wherein the first P complex numbers are numbers, in the K complex numbers, obtained by arranging modulus values of the K complex numbers in the second complex number set in descending order, Q is a positive number greater than 1, and Q further meets the following condition:
    when n is equal to 6, Q is greater than 1.34 and less than 1.42.

7. A signal receiving method, applied to a receiving device, and comprising:
    receiving a modulated symbol from a sending device; and
    demodulating the modulated symbol based on a complex number set corresponding to the modulated symbol, to obtain a bit stream, wherein
    a value of the modulated symbol is one of a plurality of complex number sets, each of the plurality of complex number sets comprises $Y=2^n$ complex numbers, n is a modulation order of the bit stream, and a ratio of a real part of a first complex number with a largest absolute value of the real part in the complex number set to a real part of a second complex number with a smallest absolute value of the real part in the complex number set is equal to M:N, wherein M and N are positive integers, a greatest common divisor of M and N is 1, and M further meets at least one of the following:
    when n is equal to 4, M is greater than 3 and less than 16;
    when n is equal to 6, M is greater than 7 and less than 32;
    when n is equal to 8, M is greater than 15 and less than 64; or when n is equal to 10, M is greater than 31 and less than 128.

8. The method according to claim 7, wherein each of the plurality of complex number sets further meets:
a ratio of an imaginary part of a third complex number whose absolute value of the imaginary part is largest in the complex number set to an imaginary part of a fourth complex number whose absolute value of the imaginary part is smallest in the complex number set is equal to M:N.

9. The method according to claim 7, wherein the plurality of complex number sets comprise a first complex number set and a second complex number set, the first complex number set is determined based on a first modulation and coding scheme, and the second complex number set is determined based on a second modulation and coding scheme; and
when a modulation order corresponding to the first modulation and coding scheme is equal to a modulation order corresponding to the second modulation and coding scheme, values obtained by multiplying K complex numbers in the first complex number set by a real number A are respectively equal to values obtained by multiplying K complex numbers in the second complex number set by a real number B, and Y-K complex numbers in the first complex number set other than the K complex numbers are not equal to values obtained by multiplying Y-K complex numbers in the second complex number set other than the K complex numbers by any non-zero real number, wherein K is an integer smaller than Y, and the real number A and the real number B are normalization coefficients.

10. The method according to claim 9, wherein
a modulus value of any complex number in the K complex numbers in the first complex number set is greater than a modulus value of any complex number in the Y-K complex numbers in the first complex number set; and/or
a modulus value of any complex number in the K complex numbers in the second complex number set is greater than a modulus value of any complex number in the Y-K complex numbers in the second complex number set.

11. A sending device, comprising:
at least one processor; and
a memory storing programming instructions for execution by the at least one processor, the programming instructions instructing the network device to perform operations comprising:
modulating a bit stream to generate a modulated symbol, wherein a modulation order of the bit stream is n, a value of the modulated symbol is one of a plurality of complex number sets, each of the plurality of complex number sets comprises $Y=2^n$ complex numbers, and a ratio of a real part of a first complex number with a largest absolute value of the real part in the complex number set to a real part of a second complex number with a smallest absolute value of the real part in the complex number set is equal to M:N, wherein M and N are positive integers, a greatest common divisor of M and N is 1, and M further meets at least one of the following:
when n is equal to 4, M is greater than 3 and less than 16;
when n is equal to 6, M is greater than 7 and less than 32;
when n is equal to 8, M is greater than 15 and less than 64; or
when n is equal to 10, M is greater than 31 and less than 128; and
sending the modulated symbol to a receiving device.

12. The device according to claim 11, wherein each of the plurality of complex number sets further meets:
a ratio of an imaginary part of a third complex number whose absolute value of the imaginary part is largest in the complex number set to an imaginary part of a fourth complex number whose absolute value of the imaginary part is smallest in the complex number set is equal to M:N.

13. The device according to claim 11, wherein the operations further comprises:
determining each of the plurality of complex number sets based on a modulation and coding scheme, wherein the complex number set is a first complex number set when the modulation and coding scheme is a first modulation and coding scheme; or the complex number set is a second complex number set when the modulation and coding scheme is a second modulation and coding scheme, wherein
when a modulation order corresponding to the first modulation and coding scheme is equal to a modulation order corresponding to the second modulation and coding scheme, values obtained by multiplying K complex numbers in the first complex number set by a real number A are respectively equal to values obtained by multiplying K complex numbers in the second complex number set by a real number B, and Y-K complex numbers in the first complex number set other than the K complex numbers are not equal to values obtained by multiplying Y-K complex numbers in the second complex number set other than the K complex numbers by any non-zero real number, wherein K is an integer smaller than Y, and the real number A and the real number B are normalization coefficients.

14. The device according to claim 13, wherein
a modulus value of any complex number in the K complex numbers in the first complex number set is greater than a modulus value of any complex number in the Y-K complex numbers in the first complex number set; and/or
a modulus value of any complex number in the K complex numbers in the second complex number set is greater than a modulus value of any complex number in the Y-K complex numbers in the second complex number set.

15. The device according to claim 13, wherein when n is equal to 6, K is equal to 32.

16. The device according to claim 13, wherein
a ratio of a modulus value of a complex number in first P complex numbers to a modulus value of a complex number in K-P complex numbers in the first complex number set other than the P complex numbers is equal to Q, wherein the first P complex numbers are numbers, in the K complex numbers, obtained by arranging modulus values of the K complex numbers in the first complex number set in descending order, Q is a positive number greater than 1, and Q further meets the following condition:
when n is equal to 6, Q is greater than 1.34 and less than 1.42; and
a ratio of a modulus value of a complex number in first P complex numbers to a modulus value of a complex number in K-P complex numbers in the second complex number set other than the P complex numbers is equal to Q, wherein the first P complex numbers are numbers, in the K complex numbers, obtained by arranging modulus values of the K complex numbers in the second complex number set in descending order, Q is a positive number greater than 1, and Q further meets the following condition:

when n is equal to 6, Q is greater than 1.34 and less than 1.42.

17. A receiving device, comprising:
at least one processor; and
a memory storing programming instructions for execution by the at least one processor, the programming instructions instructing the network device to perform operations comprising:
receiving a modulated symbol from a sending device; and
demodulating the modulated symbol based on a complex number set corresponding to the modulated symbol, to obtain a bit stream, wherein
a value of the modulated symbol is one of a plurality of complex number sets, each of the plurality of complex number sets comprises $Y=2^n$ complex numbers, n is a modulation order of the bit stream, and a ratio of a real part of a first complex number with a largest absolute value of the real part in the complex number set to a real part of a second complex number with a smallest absolute value of the real part in the complex number set is equal to M:N, wherein M and N are positive integers, a greatest common divisor of M and N is 1, and M further meets at least one of the following:
when n is equal to 4, M is greater than 3 and less than 16;
when n is equal to 6, M is greater than 7 and less than 32;
when n is equal to 8, M is greater than 15 and less than 64; or
when n is equal to 10, M is greater than 31 and less than 128.

18. The device according to claim 17, wherein each of the plurality of complex number sets further meets:
a ratio of an imaginary part of a third complex number whose absolute value of the imaginary part is largest in the complex number set to an imaginary part of a fourth complex number whose absolute value of the imaginary part is smallest in the complex number set is equal to M:N.

19. The device according to claim 17, wherein the plurality of complex number sets comprise a first complex number set and a second complex number set, the first complex number set is determined based on a first modulation and coding scheme, and the second complex number set is determined based on a second modulation and coding scheme; and
when a modulation order corresponding to the first modulation and coding scheme is equal to a modulation order corresponding to the second modulation and coding scheme, values obtained by multiplying K complex numbers in the first complex number set by a real number A are respectively equal to values obtained by multiplying K complex numbers in the second complex number set by a real number B, and Y-K complex numbers in the first complex number set other than the K complex numbers are not equal to values obtained by multiplying Y-K complex numbers in the second complex number set other than the K complex numbers by any non-zero real number, wherein K is an integer smaller than Y, and the real number A and the real number B are normalization coefficients.

20. The device according to claim 19, wherein
a modulus value of any complex number in the K complex numbers in the first complex number set is greater than a modulus value of any complex number in the Y-K complex numbers in the first complex number set; and/or
a modulus value of any complex number in the K complex numbers in the second complex number set is greater than a modulus value of any complex number in the Y-K complex numbers in the second complex number set.

* * * * *